United States Patent
Wu et al.

(10) Patent No.: US 11,589,307 B2
(45) Date of Patent: Feb. 21, 2023

(54) TRANSMITTING AND RECEIVING GROUP WAKE UP SIGNALS

(71) Applicant: QUALCOMM Incorporated, San Diego, CA (US)

(72) Inventors: Shuanshuan Wu, San Diego, CA (US); Wanshi Chen, San Diego, CA (US); Anantharaman Balasubramanian, San Diego, CA (US); Gabi Sarkis, San Diego, CA (US); Kapil Gulati, Belle Mead, NJ (US); Stelios Stefanatos, San Diego, CA (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 17/308,318

(22) Filed: May 5, 2021

(65) Prior Publication Data
US 2021/0377857 A1    Dec. 2, 2021

Related U.S. Application Data

(60) Provisional application No. 63/030,735, filed on May 27, 2020.

(30) Foreign Application Priority Data

Jun. 10, 2020   (GR) .............................. 20200100324

(51) Int. Cl.
*H04W 52/02*   (2009.01)
*H04W 52/28*   (2009.01)
*H04W 72/04*   (2009.01)
*H04W 76/28*   (2018.01)
(Continued)

(52) U.S. Cl.
CPC ... *H04W 52/0219* (2013.01); *H04W 52/0229* (2013.01); *H04W 52/283* (2013.01); *H04W 72/02* (2013.01); *H04W 72/0446* (2013.01); *H04W 76/28* (2018.02)

(58) Field of Classification Search
CPC ......... H04W 52/0219; H04W 52/0229; H04W 52/283; H04W 72/02; H04W 7/0446; H04W 76/28; H04W 4/40–48; Y02D 30/70
See application file for complete search history.

(56) References Cited

U.S. PATENT DOCUMENTS

| 2018/0262865 A1* | 9/2018 | Lepp | ................ | H04W 52/0235 |
| 2020/0196240 A1* | 6/2020 | Zhang | ................ | G08G 1/166 |
| 2022/0086759 A1* | 3/2022 | Höglund | ............ | H04W 68/005 |

(Continued)

*Primary Examiner* — Robert C Scheibel
(74) *Attorney, Agent, or Firm* — Harrity & Harrity, LLP

(57) ABSTRACT

Various aspects of the present disclosure generally relate to wireless communication. In some aspects, a user equipment (UE) may generate a wake up signal to wake up a plurality of second UEs. The wake up signal may be based at least in part on location information associated with the UE, location information associated with one or more of the plurality of second UEs, or a combination thereof. The UE may further transmit, to the plurality of second UEs, the wake up signal. Accordingly, the plurality of second UEs may receive the wake up signal and monitor for messages from the second UE based at least in part on receiving the wake up signal. Numerous other aspects are provided.

30 Claims, 16 Drawing Sheets

(51) Int. Cl.
*H04W 72/02* (2009.01)
*H04W 72/0446* (2023.01)

(56) References Cited

U.S. PATENT DOCUMENTS

2022/0124617 A1* 4/2022 Takeda .................. H04W 76/27
2022/0201608 A1* 6/2022 Takeda .............. H04W 52/0219
2022/0240221 A1* 7/2022 Takeda .................. H04W 68/02

* cited by examiner

TRANSMITTING AND RECEIVING GROUP WAKE UP SIGNALS

CROSS-REFERENCE TO RELATED APPLICATIONS

This Patent Application claims priority to U.S. Provisional Patent Application No. 63/030,735, filed on May 27, 2020, entitled "TRANSMITTING AND RECEIVING GROUP WAKE UP SIGNALS," and assigned to the assignee hereof. This Patent Application also claims priority to Grecian Patent Application No. 20200100324, filed on Jun. 10, 2020, entitled "TECHNIQUES FOR LOCATION-BASED WAKEUP SIGNAL TRANSMISSION," and assigned to the assignee hereof. The disclosures of the prior Applications are considered part of and are incorporated by reference in this Patent Application.

FIELD OF THE DISCLOSURE

Aspects of the present disclosure generally relate to wireless communication and to techniques and apparatuses for transmitting and receiving group wake up signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors coupled to the memory, the memory and the one or more processors configured to generate a wake up signal to wake up a plurality of second UEs, wherein the wake up signal is based at least in part on location information associated with the UE, location information associated with one or more of the plurality of second UEs, or a combination thereof; and transmit, to the plurality of second UEs, the wake up signal.

In some aspects, a UE for wireless communication includes a memory and one or more processors coupled to the memory, the memory and the one or more processors configured to receive, from a second UE, a wake up signal that is associated with the UE and with at least one third UE, wherein the wake up signal is based at least in part on location information associated with the second UE, location information associated with the UE and the at least one third UE, or a combination thereof; and monitor for messages from the second UE based at least in part on receiving the wake up signal.

In some aspects, a method of wireless communication performed by a UE includes generating a wake up signal to wake up a plurality of second UEs, wherein the wake up signal is based at least in part on location information associated with the UE, location information associated with one or more of the plurality of second UEs, or a combination thereof; and transmitting, to the plurality of second UEs, the wake up signal.

In some aspects, a method of wireless communication performed by a UE includes receiving, from a second UE, a wake up signal that is associated with the UE and with at least one third UE, wherein the wake up signal is based at least in part on location information associated with the second UE, location information associated with the UE and the at least one third UE, or a combination thereof; and monitoring for messages from the second UE based at least in part on receiving the wake up signal.

In some aspects, a non-transitory computer-readable medium stores one or more instructions for wireless communication that, when executed by one or more processors of a UE, cause the UE to generate a wake up signal to wake up a plurality of second UEs, wherein the wake up signal is based at least in part on location information associated with the UE, location information associated with one or more of the plurality of second UEs, or a combination thereof; and transmit, to the plurality of second UEs, the wake up signal.

In some aspects, a non-transitory computer-readable medium stores one or more instructions for wireless communication that, when executed by one or more processors of a UE, cause the UE to receive, from a second UE, a wake up signal that is associated with the UE and with at least one third UE, wherein the wake up signal is based at least in part on location information associated with the second UE, location information associated with the UE and the at least one third UE, or a combination thereof; and monitor for messages from the second UE based at least in part on receiving the wake up signal.

In some aspects, an apparatus for wireless communication may include means for generating a wake up signal to wake up a plurality of UEs, wherein the wake up signal is based at least in part on location information associated with the apparatus, location information associated with one or more of the plurality of UEs, or a combination thereof; and means for transmitting, to the plurality of UEs, the wake up signal.

In some aspects, an apparatus for wireless communication may include means for receiving, from a first UE, a wake up signal that is associated with the apparatus and with at least one second UE, wherein the wake up signal is based at least in part on location information associated with the first UE, location information associated with the apparatus and the at least one second UE, or a combination thereof; and means for monitoring for messages from the first UE based at least in part on receiving the wake up signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
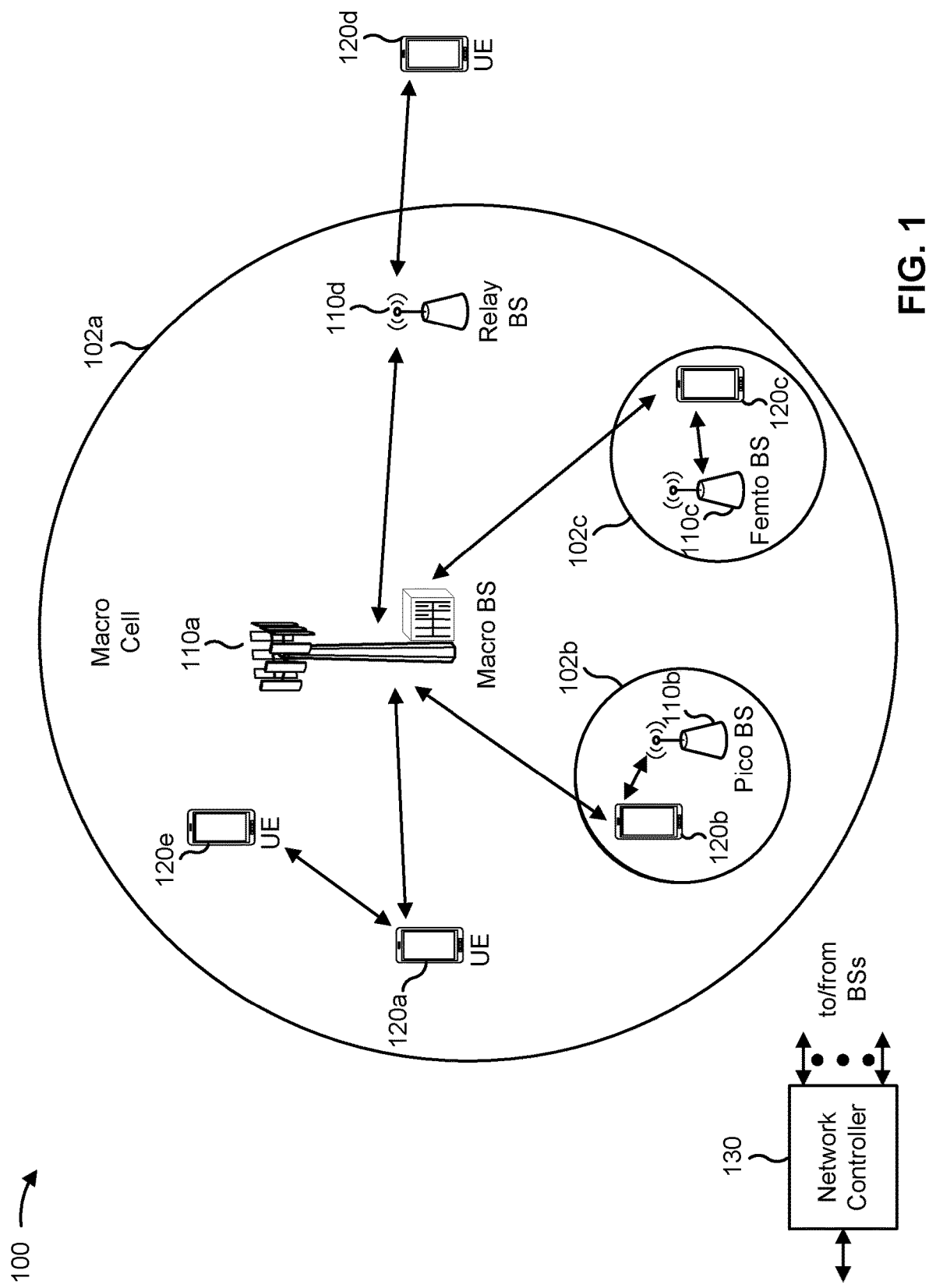
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a cellular V2X (CV2X) protocol, a vehicle-to-vehicle (V2V) protocol, and/or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
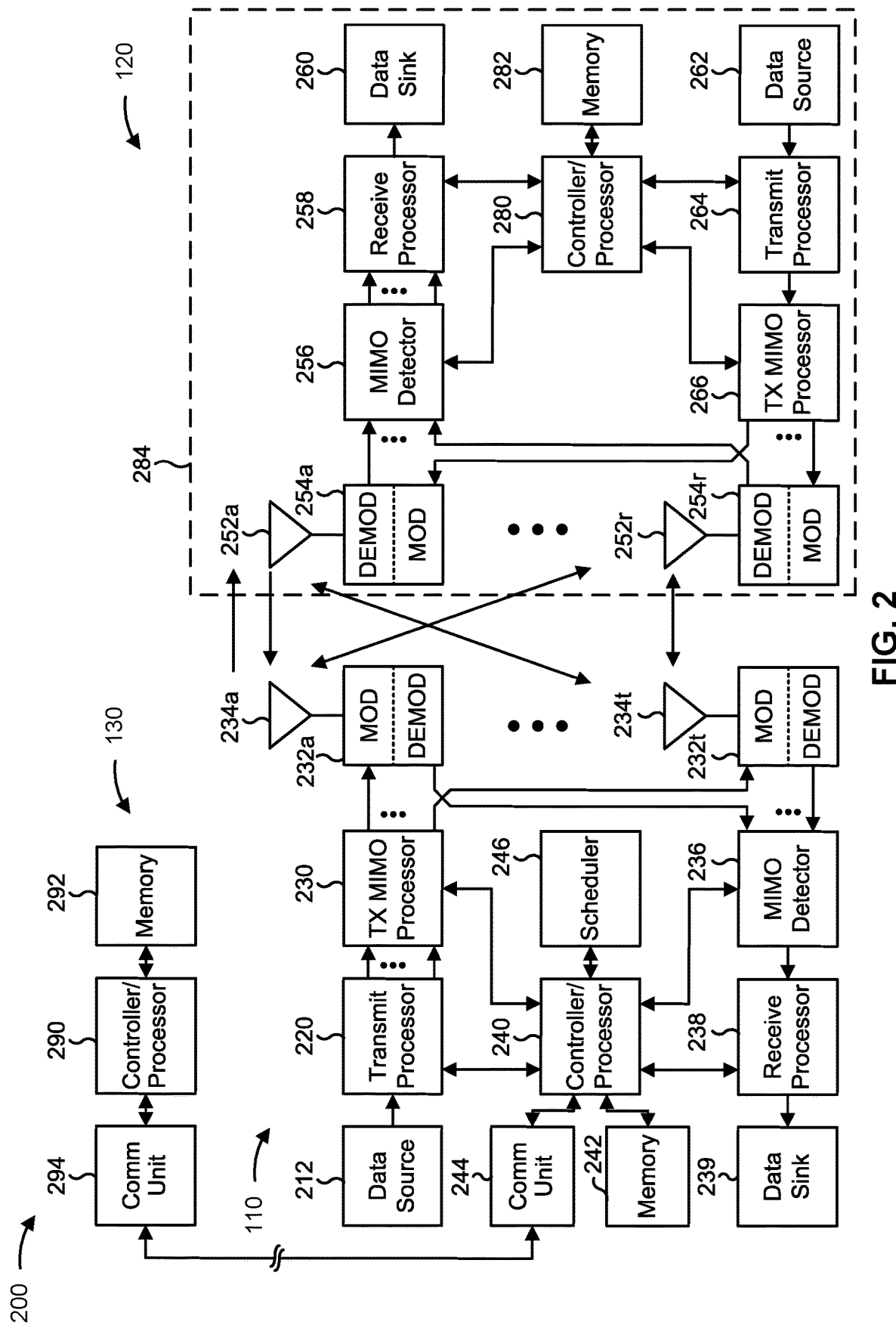
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 6-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 6-14).

Controller/processor 240 of base station 110, controller/processor 280 of UE 120, and/or any other component(s) of FIG. 2 may perform one or more techniques associated with transmitting and receiving group wake up signals, as described in more detail elsewhere herein. For example, controller/processor 240 of base station 110, controller/processor 280 of UE 120, and/or any other component(s) of FIG. 2 may perform or direct operations of, for example, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, and/or other processes as described herein. In some aspects, executing instructions may include running the instructions, converting the instructions, compiling the instructions, and/or interpreting the instructions, among other examples.

In some aspects, a UE (e.g., the UE 120a) may include means for generating a wake up signal to wake up a plurality of second UEs (e.g., including the UE 120e), wherein the wake up signal is based at least in part on location information associated with the UE, location information associated with one or more of the plurality of second UEs, or a combination thereof; and/or means for transmitting, to the plurality of second UEs, the wake up signal. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a UE (e.g., the UE 120e) may include means for receiving, from a second UE (e.g., the UE 120a), a wake up signal that is associated with the UE and with at least one third UE, wherein the wake up signal is based at least in part on location information associated with the second UE, location information associated with the UE and the at least one third UE, or a combination thereof; and/or means for monitoring for messages from the second UE based at least in part on receiving the wake up signal. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
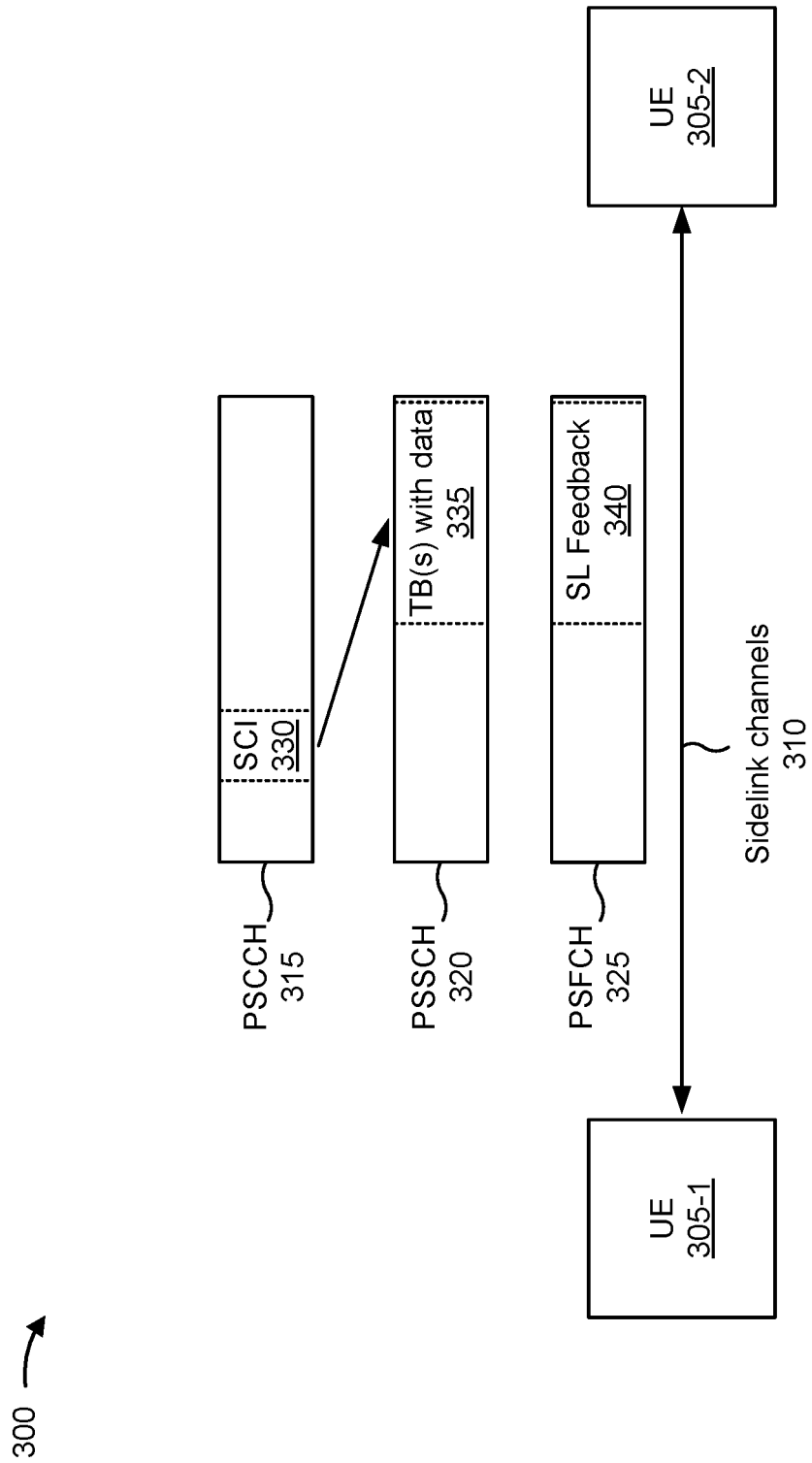
FIG. 3 is a diagram illustrating an example of sidelink communications, in accordance with the present disclosure.

FIG. 3 is a diagram illustrating an example 300 of sidelink communications, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-pedestrian (V2P) communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
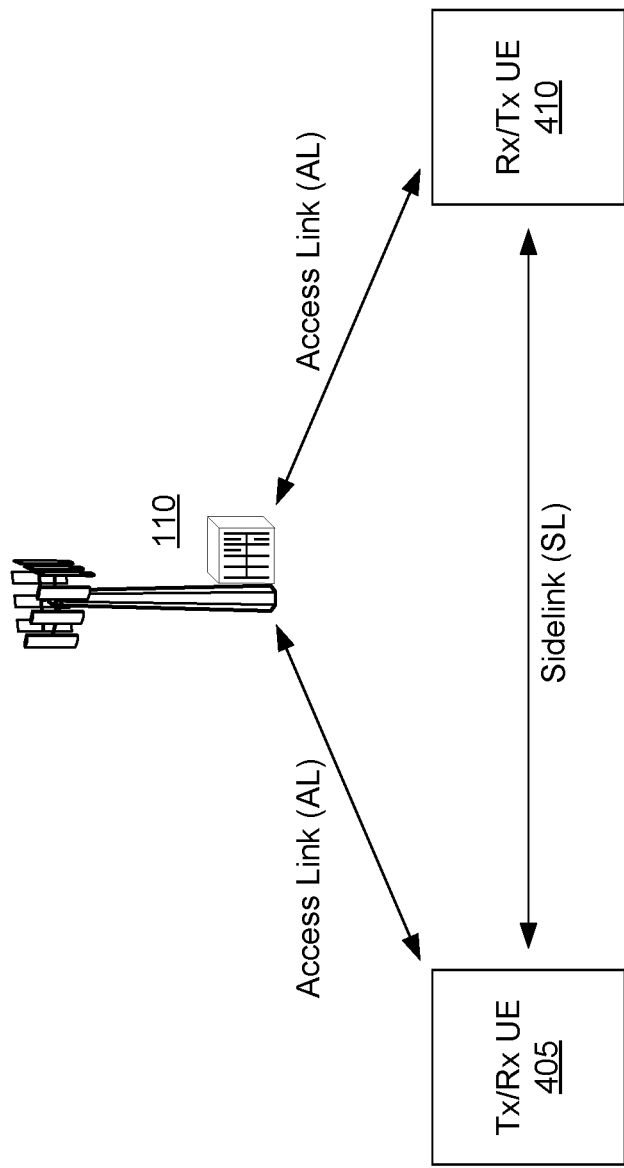
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure. As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
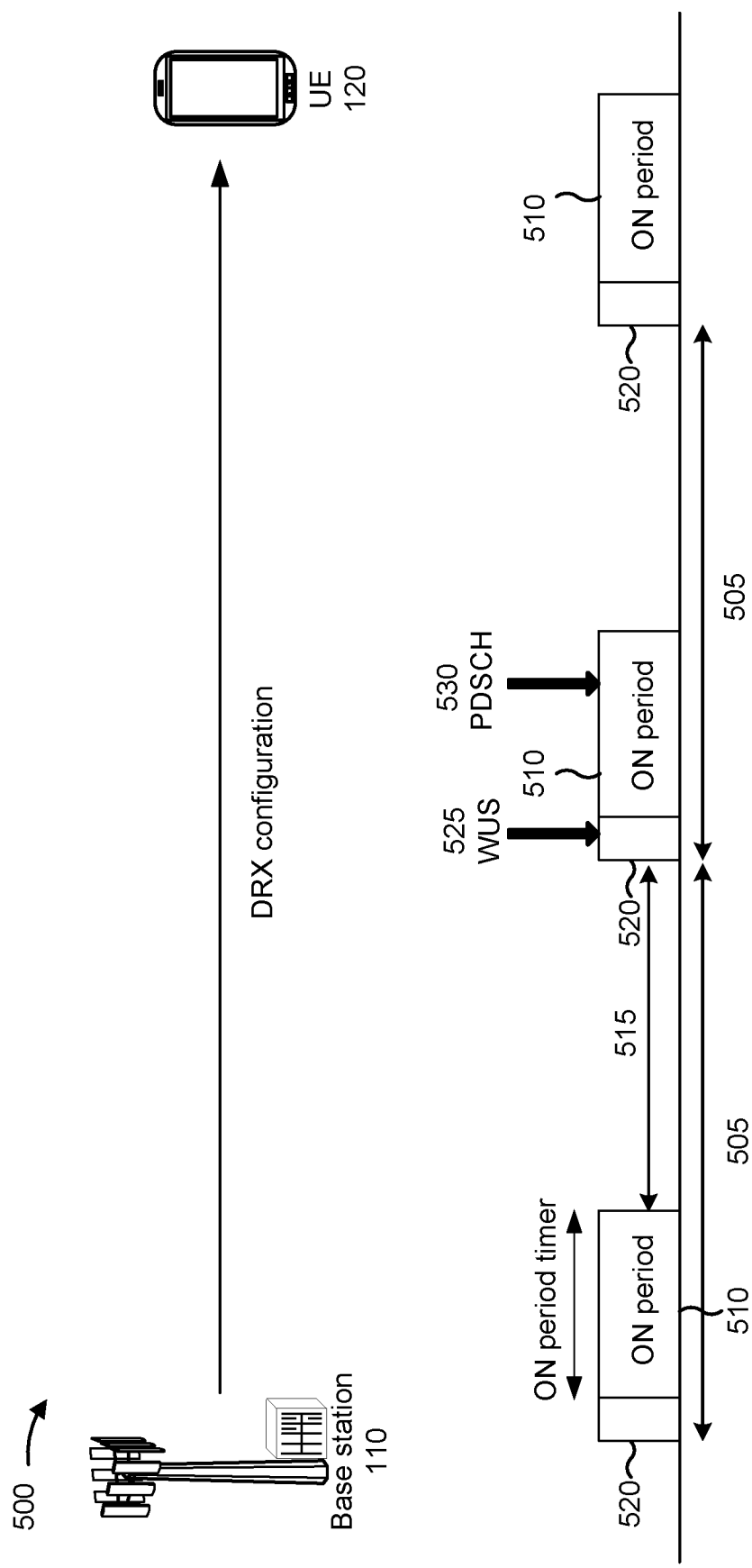
FIG. 5 is a diagram illustrating an example of a discontinuous reception (DRX) cycle, in accordance with the present disclosure.

FIG. 5 is a diagram illustrating an example 500 of a discontinuous reception (DRX) cycle, in accordance with the present disclosure. As shown in FIG. 5, a base station 110 may transmit a DRX configuration to a UE 120 to configure a DRX cycle 505 for the UE 120. A DRX cycle 505 may include a DRX on duration 510 (e.g., during which a UE 120 is awake or in an active state) and an opportunity to enter a DRX sleep state 515. As used herein, the time during which the UE 120 is configured to be in an active state during the DRX on duration 510 may be referred to as an active time (and/or referred to as an "ON period"), and the time during which the UE 120 is configured to be in the DRX sleep state 515 may be referred to as an inactive time. As described below, the UE 120 may monitor a PDCCH during the active time, and may refrain from monitoring the PDCCH during the inactive time.

The DRX ON period 510 may be preceded by a wake up signal (WUS) occasion 520. If the UE 120 receives a wake up signal 525 directed to the UE 120 in a WUS occasion 520, then the UE 120 may enter the DRX ON period 510. Thus, the DRX ON period 510 may be referred to as associated with the wake up signal 525 and the WUS occasion 520 preceding the DRX on duration 510. If the UE 120 does not receive a wake up signal 525 in a WUS occasion 520 or the wake up signal 525 is not directed to the UE 120, the UE 120 may skip the active time, thereby conserving power. In some aspects, the wake up signal 525 may carry information regarding which UE or UEs are to be paged (e.g., one or more UEs to which the wake up signal 525 is directed based at least in part on a radio network temporary identifier (RNTI) or a temporary mobile subscriber identity (TMSI)). As an alternative, a PDCCH carrying the wake up signal 525 may be scrambled using a paging RNTI that is common to all UEs. As described herein, the UE 120 may monitor a PDSCH during the active time, and may refrain from monitoring the PDSCH during the inactive time.

During the DRX on duration 510 (e.g., the active time), the UE 120 may monitor a downlink control channel (e.g., a PDCCH), as shown by reference number 530. For example, the UE 120 may monitor the PDCCH for downlink control information (DCI) pertaining to the UE 120. If the UE 120 does not detect and/or successfully decode any PDCCH communications intended for the UE 120 during the DRX on duration 510, then the UE 120 may enter the sleep state 515 (e.g., for the inactive time) at the end of the DRX on duration 510, as shown by reference number 525. In this way, the UE 120 may conserve battery power and reduce power consumption. As shown, the DRX cycle 505 may repeat with a configured periodicity according to the DRX configuration.

If the UE 120 detects and/or successfully decodes a PDCCH communication intended for the UE 120, then the UE 120 may remain in an active state (e.g., awake) for the duration of an ON period timer (e.g., which may extend the active time). The UE 120 may start the ON period timer at a time at which the PDCCH communication is received (e.g., in a TTI in which the PDCCH communication is received, such as a slot or a subframe). The UE 120 may remain in the active state until the ON period timer expires, at which time the UE 120 may enter the sleep state 515 (e.g., for the inactive time). During the duration of the ON period timer, the UE 120 may continue to monitor for PDCCH communications, may obtain a downlink data communication (e.g., on a downlink data channel, such as a PDSCH) scheduled by the PDCCH communication, and/or may prepare and/or transmit an uplink communication (e.g., on a PUSCH) scheduled by the PDCCH communication. In some aspects, the UE 120 may restart the ON period timer after each detection of a PDCCH communication for the UE 120 for an initial transmission (e.g., but not for a retransmission). By operating in this manner, the UE 120 may conserve battery power and reduce power consumption by entering the sleep state 515.

As indicated above, FIG. 5 is provided as an example. Other examples may differ from what is described with respect to FIG. 5.

UEs in some deployments may communicate with each other via sidelink channels. One example of an environment in which sidelink communication is beneficial is the V2X/CV2X environment (e.g., as described in connection with FIG. 4). In a CV2X environment, vehicle UEs (V-UEs) and pedestrian UEs (P-UEs) may communicate with each other to facilitate safe and efficient operation of vehicles and movement of pedestrians. For example, a V-UE may transmit a basic safety message (BSM) to a set of P-UEs indicating that the V-UE is approaching a crosswalk at a high speed, and the set of P-UEs may notify respective users or a pedestrian management system associated with the crosswalk regarding the V-UE. As another example, a V-UE associated with an emergency vehicle may transmit a message to a set of V-UEs and/or P-UEs indicating that a route of the emergency vehicle is to be cleared.

A DRX cycle (e.g., as described above in connection with FIG. 5), may be useful to conserve battery power and reduce power consumption of UEs. However, in a non-centrally-scheduled environment, such as some V2X environments, a DRX cycle may be difficult to manage. For example, in a centrally-scheduled environment, a base station may control or be aware of the DRX cycles of a set of UEs scheduled by the base station, so the base station can efficiently transmit wake up signals during the WUS occasions of the set of UEs. However, in an environment without a central scheduler, such as a V2X environment without base station coverage (e.g., PC5 operation), messages may be transmitted from a transmitter UE to a receiver UE without having established a link between the UEs. If the receiver UE is associated with a DRX cycle, then the transmitter UE may first need to determine the WUS occasion of the receiver UE and transmit a wake up signal in the WUS occasion. This may take time and communication resources, thereby delaying communication between the receiver UE and the transmitter UE and introducing congestion to the system.

Accordingly, in some cases, a UE may seek to transmit a wake up signal to a plurality of other UEs. For example, a road side unit (RSU) or V-UE may need to wake up nearby V-UEs and/or P-UEs in order to communicate with the nearby V-UEs and/or P-UEs. However, the UE may consume resources to transmit a plurality of wake up signals to the plurality of other UEs. Moreover, there may be high latency when the UE has to send the plurality of wake up signals separately in time to the plurality of other UEs.

Some techniques and apparatuses described herein may allow for a UE (e.g., UE 120*a*) to transmit a single wake up signal to a plurality of other UEs (e.g., UE 120*b*, UE 120*c*, and/or another UE). As a result, the UE 120*a* may conserve processing and network resources by generating and broadcasting a single wake up signal that causes the plurality of other UEs to wake up. Moreover, the UE 120*a* may wake up the plurality of other UEs with lower latency by broadcasting the single wake up signal.

To facilitate such group wake up signals, some techniques and apparatuses described herein provide location-based wake up signaling. The location-based wake up signaling may be based at least in part on geographic zones. In some aspects, a geographic zone may be associated with a corresponding wake up signal. As a result, receiver UEs (e.g., UE 120*b*, UE 120*c*, and/or another UE) within a geographic zone, that receive a wake up signal corresponding to the geographic zone, may enter an ON period of a DRX mode. Accordingly, a wake up signal can be directed to all UEs within a geographic zone, thereby conserving power and communication resources that would otherwise be used for per-UE determination of WUS occasions and transmissions of wake up signals.

In some aspects, receiver UEs within a geographic zone may all use a same DRX cycle such that WUS occasions of the receiver UEs are aligned with each other. As a result, a transmitter UE (e.g., UE 120*a*) may transmit a single wake up signal (or at least a reduced quantity of wake up signals can be transmitted). Thus, communication resource usage associated with determining different WUS occasions and transmitting different wake up signals is reduced. In some aspects, a wake up signal may indicate a location of a transmitter UE. For example, the wake up signal may indicate a geographic zone of the transmitter UE. Thus, receiver UEs can determine whether or not to enter an ON period of a DRX mode after receiving the wake up signal, thereby conserving power and communication resources that would otherwise be used to indiscriminately enter the active time after receiving the wake up signal.

Figure 6:
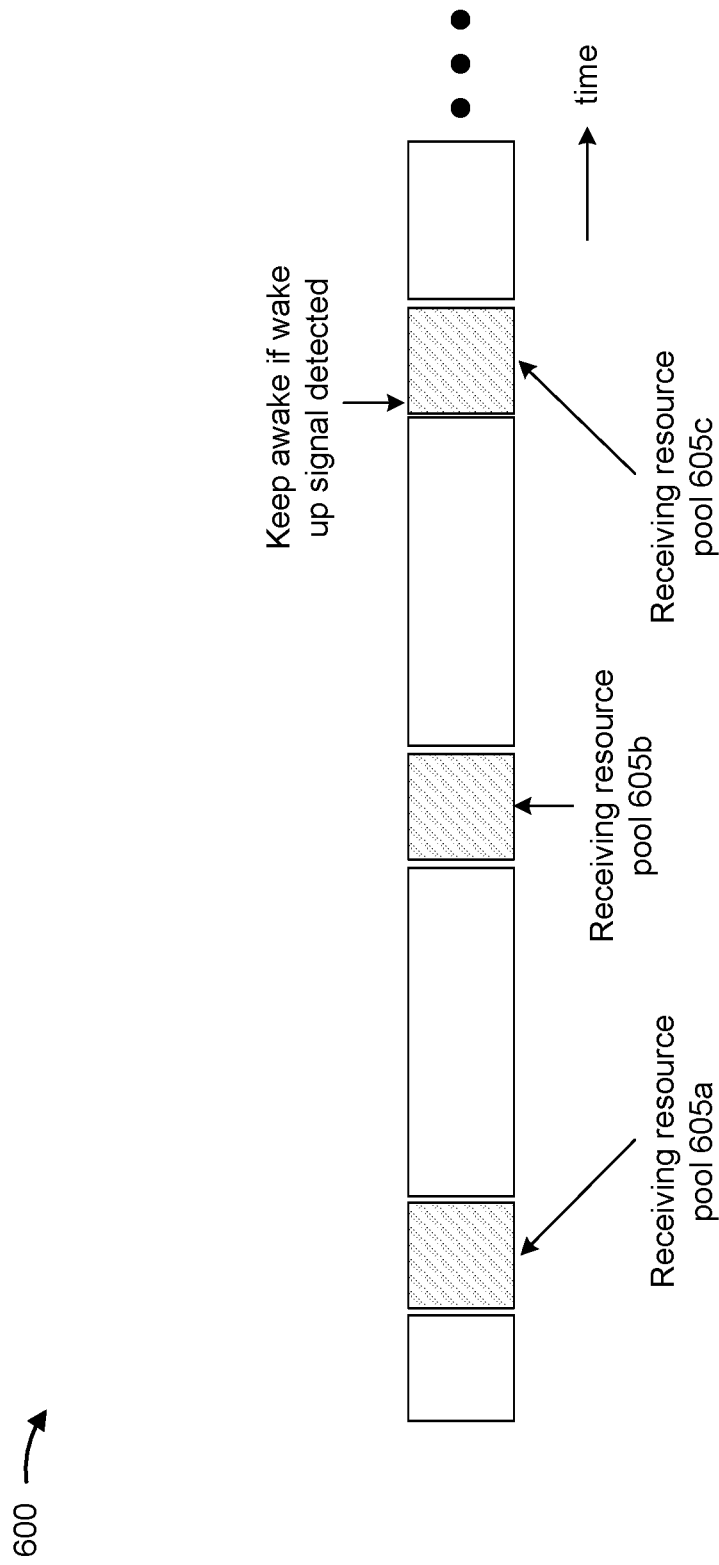
FIG. 6 is a diagram illustrating an example of resource periods for receiving wake up signals, in accordance with the present disclosure.

FIG. 6 is a diagram illustrating an example 600 of resource periods 605*a*, 605*b*, and 605*c* within a resource pool for receiving wake up signals. As shown in FIG. 6, a UE (e.g., UE 120) may monitor for wake up signals within the resource periods 605*a*, 605*b*, and 605*c* in the resource pool. Although the description below will focus on three resource periods, the description equally applies to any type of resource configurations, for example any number of resource pools and/or any period within a resource pool, such as two, four, five, and so on. Moreover, the resource pools may be periodic such that the set of resource periods may continue for a certain duration of time or indefinitely as long as the UE 120 is powered on.

As shown in FIG. 6, the resource periods 605*a*, 605*b*, and 605*c* may provide one or more wake up signal occasions in which a base station (e.g., base station 110) and/or another UE (e.g., on a sidelink channel as described above in connection with FIGS. 3-4) may transmit a wake up signal to the UE 120. For example, as further shown in FIG. 6, the resource periods 605*a*, 605*b*, and 605*c* may define one or more occasions in which the UE 120 monitors for a wake up signal. In some aspects, the occasions may include one or more slots. As used herein, "slot" may refer a portion of a radio frame within an LTE, 5G, or other wireless communication structure. In some aspects, a slot may include one or more symbols. Moreover, "symbol" may refer to an OFDM symbol or other similar symbol within a slot.

As further shown in FIG. 6, when the UE 120 receives a wake up signal within one or more slots of a resource period (e.g., resource period 605*a*, resource period 605*b*, and/or resource period 605*c*), the wake up signal may cause the UE 120 to monitor for messages within remaining slots of the resource period. For example, if the UE 120 receives the wake up signal within the first slot of the resource period, the second slot of the resource period, and/or another slot of the resource period, the UE 120 may then monitor for messages within the remaining slots that compose the resource period (e.g., all slots that follow the slot in which the wake up signal was received).

In some aspects, as described above with respect to FIG. 5, the wake up signal may include or map to information that the UE 120 uses to determine whether the wake up signal is intended for the UE 120. For example, as described below in connection with FIG. 7, the UE 120 may use the information to determine whether to monitor remaining slots within a resource period (e.g., resource period 605*a*, resource period 605*b*, and/or resource period 605*c*) in which the wake up signal was received or to discard the wake up signal.

In some aspects, the resource periods 605*a*, 605*b*, and 605*c* may be predetermined. For example, the UE 120 may monitor the resource periods 605*a*, 605*b*, and 605*c*, as defined in 3GPP specifications and/or another standard. Additionally, or alternatively, the UE 120 may configure the resource periods 605*a*, 605*b*, and 605*c* and inform one or more base stations (e.g., base station 110) and/or one or more other UEs (e.g., on one or more sidelink channels as described above in connection with FIGS. 3-4) of the resource periods 605*a*, 605*b*, and 605*c*. For example, the UE 120 may indicate the resource periods 605*a*, 605*b*, and 605*c* in a broadcast message sent (e.g., periodically) to the one or more base stations and/or the one or more other UEs. Additionally, or alternatively, the base station 110 may transmit a message to the UE 120 that configures the resource periods 605*a*, 605*b*, and 605*c*. In some aspects, the base station 110 may further transmit an indication of the resource periods 605*a*, 605*b*, and 605*c* to one or more additional base stations and/or one or more additional UEs (e.g., one or more UEs communicating with the UE 120 on a sidelink channel).

By monitoring for wake up signals within a predetermined resource pool, such as the resource pool including resource periods 605*a*, 605*b*, and 605*c*, the UE 120 may conserve power. Moreover, the UE 120 may use a DRX cycle (e.g., the DRX cycle 505 of FIG. 5) with the resource periods of FIG. 6 to conserve additional power. For example, the UE 120 may use the resource periods 605*a*, 605*b*, and 605*c* as DRX sleep states in which a wake up signal (e.g., the wake up signal 525) may be received and may refrain from monitoring for wake up signals in resources outside the resource periods 605*a*, 605*b*, and 605*c*.

As indicated above, FIG. 6 is provided as an example. Other examples may differ from what is described with respect to FIG. 6.

Figure 7:
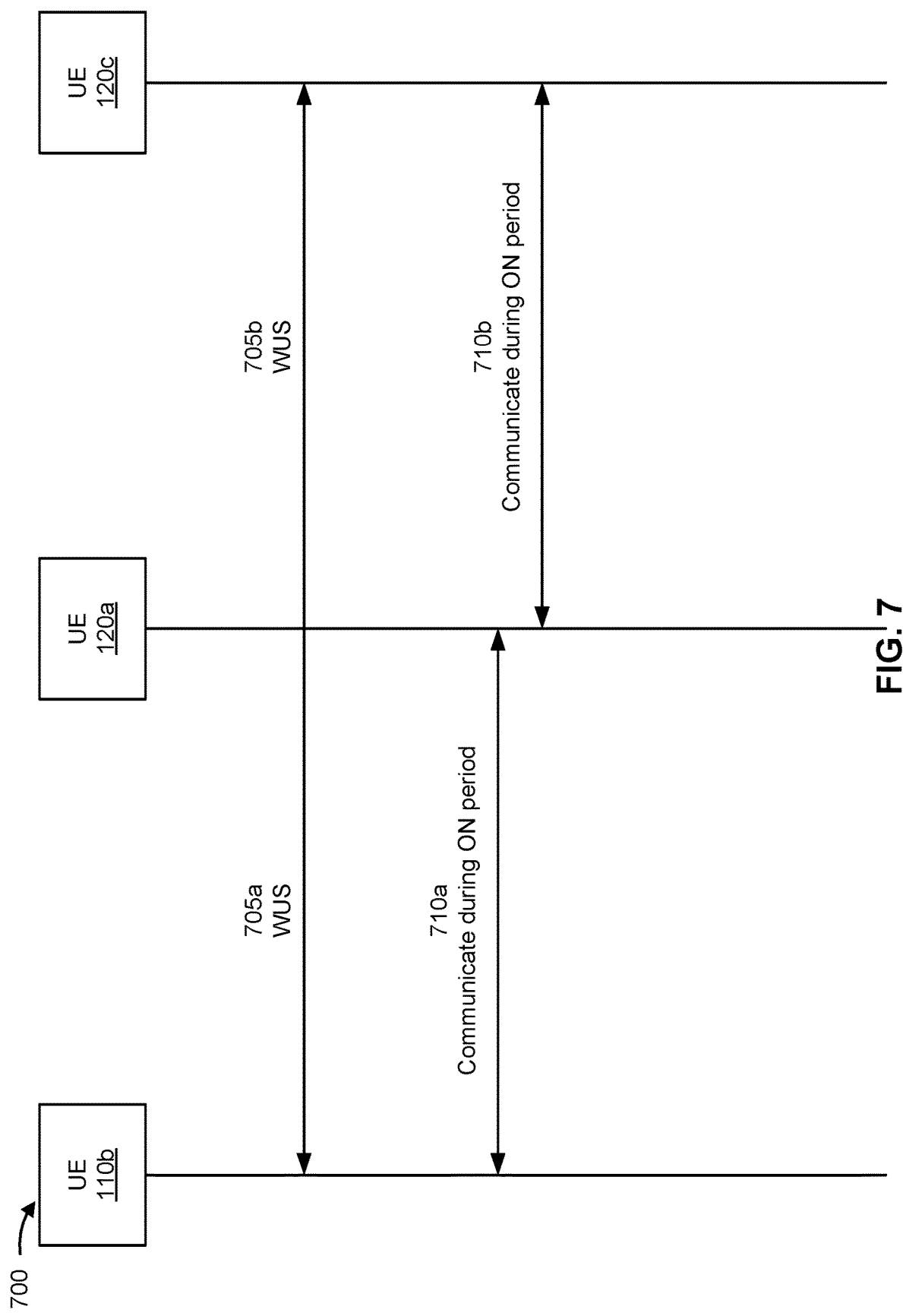
FIG. 7 is a diagram illustrating an example of a UE transmitting a wake up signal to a plurality of other UEs, in accordance with the present disclosure.

FIG. 7 is a diagram illustrating an example 700 of a UE 120*a* transmitting a wake up signal to a plurality of other UEs (e.g., a second UE 120*b* and a third UE 120*c*), in accordance with the present disclosure. In some aspects, the UE 120*a* may comprise at least one of a V-UE, an RSU, or a combination thereof. Additionally, or alternatively, the second UE 120*b* and/or the third UE 120*c* may comprise at least one of a P-UE, a V-UE, or a combination thereof. Although the description below will focus on the UE 120*b* and the UE 120*c*, the description applies equally to any number of UEs in the plurality of other UEs, such as three, four, and so on.

In some aspects, the UE 120*a* may generate a wake up signal to wake up a plurality of other UEs (e.g., the second UE 120*b* and/or the third UE 120*c*). For example, the UE 120*a* may determine that the UE 120*b* and the UE 120*c* are both within a threshold distance, within communication range, and/or within one or more geographic zones such that a single wake up signal can be received by both the UE 120*b* and the UE 120*c*. Additionally, or alternatively, the UE 120*a* may receive one or more broadcast messages from both the UE 120*b* and the UE 120*c* and, based at least in part on receiving the one or more broadcast messages, determine that a single wake up signal can be received by both the UE 120*b* and the UE 120*c*.

In some aspects, the wake up signal may be based at least in part on one or more of: a group identifier associated with a group including at least the UE 120*b* and the UE 120*c*; location information associated with the UE 120*a*; location information associated with at least the UE 120*b* and the UE 120*c*; a UE identifier associated with the UE 120*a*; one or more UE identifiers associated with at least the UE 120*c* and the UE 120*b*; or a combination thereof. In some aspects, the wake up signal may include a message with information that indicates at least the UE 120*c* and the UE 120*b*. For example, the information may include any of the information or identifiers described above or other similar data. In some aspects, the wake up signal may comprise at least one of SCI, a medium access control (MAC) layer control element (MAC-CE), or a combination thereof.

Additionally, or alternatively, the wake up signal may include a sequence that the UE 120*b* and/or the UE 120*c* can map to information that indicates the UE 120*b* and/or the UE 120*c*, respectively. For example, the UE 120*a* may use a formula or other algorithm (e.g., as defined in 3GPP specifications and/or another standard) to convert any of the information or identifiers described above or other similar data into the sequence. Accordingly, the UE 120*b* and/or the UE 120*c* can use the algorithm to determine that the sequence maps to information that indicates the UE 120*b* and/or the UE 120*c*, respectively. For example, location information (e.g., a zone identifier associated with the UE 120*b* and/or the UE 120*c*) may be mapped to a sequence identifier for inclusion in the wake up signal. In some aspects, the wake up signal may comprise at least one sequence, such as a low peak-to-average-power ratio (PARP) sequence (e.g., a computer generated sequence, a Zadoff-Chu sequence, and/or another PARP sequence), a hybrid automatic repeat request (HARQ) sequence, and/or another sequence.

In some aspects, the UE 120*b*, the UE 120*c*, and/or one or more additional UEs may form a group. For example, the group may be based at least in part on geographic locations of the UE 120*b*, the UE 120*c*, and/or the one or more additional UEs. In some aspects, the UE 120*b*, the UE 120*c*, and/or the one or more additional UEs may determine that the UE 120*b*, the UE 120*c*, and/or the one or more additional UEs are located within threshold distances of each other. Additionally, or alternatively, the UE 120*b*, the UE 120*c*, and/or the one or more additional UEs may determine that the UE 120*b*, the UE 120*c*, and/or the one or more additional UEs are located within one or more geographic zones such that the UE 120*b*, the UE 120*c*, and/or the one or more additional UEs may form the group. For example, the UE 120*b*, the UE 120*c*, and/or the one or more additional UEs may receive one or more broadcast messages from each other to determine one or more locations of and/or one or more geographic zones including each other.

In some aspects, the UE 120*b*, the UE 120*c*, and/or one or more additional UEs may form the group by exchanging one or more messages. For example, the UE 120*b* may transmit, to at least the UE 120*c*, at least one message to form the group; receive, from at least the UE 120*c*, at least one message to form the group; or a combination thereof. Similarly, the UE 120*c* may transmit, to at least the UE 120*b*, at least one message to form the group; receive, from at least the UE 120*b*, at least one message to form the group; or a combination thereof.

In some aspects, the UE 120*b*, the UE 120*c*, and/or the one or more additional UEs may be associated with a group identifier. For example, the UE 120*b*, the UE 120*c*, and/or the one or more additional UEs may assign the group identifier during formation of the group, as described above. Additionally, or alternatively, a base station (e.g., base station 110), the UE 120*a*, and/or another device may assign the group identifier to the UE 120*b*, the UE 120*c*, and/or the one or more additional UEs. For example, the base station 110, the UE 120*a*, and/or another device may transmit the group identifier to the UE 120*b*, the UE 120*c*, and/or the one or more additional UEs.

In some aspects, the UE 120*a* may receive, from at least one of the UE 120*b*, the UE 120*c*, or the one or more additional UEs, the group identifier. For example, at least one of the UE 120*b*, the UE 120*c*, or the one or more additional UEs may transmit one or more broadcast messages including the group identifier. In some aspects, the UE 120*a* may transmit the wake up signal in response to or based at least in part on receiving the group identifier.

Additionally, or alternatively, the UE 120*b* and/or the UE 120*c* may transmit an indicator of a location of the UE 120*b* and/or the UE 120*c*, respectively. In some aspects, the UE 120*a* may transmit the wake up signal to the UE 120*b* and/or the UE 120*c* in response to or based at least in part on receiving the indicators of the locations of the UE 120*b* and/or the UE 120*c*. For example, the UE 120*a* may determine to transmit the wake up signal based at least in part on determining that the UE 120*b* and/or the UE 120*c* are within a threshold distance of the UE 120*a* and/or within one or more geographic zones such that the UE 120*b* and/or the UE 120*c* can receive the wake up signal, as described above.

Additionally, or alternatively, the UE 120*a* may receive, from at least one of the UE 120*b* or the UE 120*c*, a broadcast message including information that identifies the at least one of the UE 120*b* or the UE 120*c*. For example, the broadcast message may include a UE identifier associated with the UE 120*b* and/or UE 120*c*. In some aspects, the UE 120*b* and the UE 120*c* may transmit broadcast messages with different UE identifiers corresponding to the UE 120*b* and the UE 120*c*, respectively. As an alternative, the UE 120*b* and the UE 120*c* may share a UE identifier (e.g., a synthetic UE identifier, a virtual UE identifier, and/or another identifier) such that at least one of the UE 120*b* and the UE 120*c* transmits a broadcast message with the shared UE identifier. In some aspects, the UE 120*a* may transmit the wake up signal in response to or based at least in part on receiving the broadcast message. For example, the UE 120*a* may determine to transmit the wake up signal based at least in part on receiving a broadcast message from either or both the UE 120*b* and the UE 120*c*, as described above.

In some aspects, the wake up signal may be based at least in part on a range and inform the UE 120*b* and the UE 120*c* to wake up when located within the range of a location of the UE 120*a*. Additionally, or alternatively, and as described below in connection with FIGS. 8-12, the wake up signal may be based at least in part on an identifier of a geographic zone and inform the UE 120*b* and the UE 120*c* to wake up when located within the geographic zone. For example, the identifier may be determined using a formula or other algorithm (e.g., as defined within 3GPP specifications and/or another standard) with one or more boundaries (e.g., latitude and longitude and/or other coordinates) of the geographic zone being input to the algorithm.

In some aspects, the geographic zone may be based at least in part on at least one of a location of the UE 120*a*, a heading of the UE 120*a*, a speed of the UE 120*a*, or a combination thereof. For example, the UE 120*a* may determine one or more zones of danger based at least in part on a current location, heading, and/or speed of the UE 120*a* and transmit a wake up signal based at least in part on one or more identifiers of the one or more zones of danger. For example, the one or more zones of danger may include one or more geographic zones within a threshold distance of the UE 120*a*, within a threshold distance of a projected trajectory of the UE 120*a*, and/or another zone.

As shown by reference numbers 705*a* and 705*b*, the UE 120*a* may transmit, to the plurality of other UEs (e.g., the UE 120*b* and the UE 120*c*), the wake up signal. For example, the UE 120*a* may broadcast the wake up signal for reception by both the UE 120*b* and the UE 120*c*. As described above, the UE 120*a* may transmit the wake up signal in response to or based at least in part on receiving one or more broadcast messages from the UE 120*b* and/or the UE 120*c*. Additionally, or alternatively, the UE 120*a* may transmit the wake up signal based at least in part on a periodicity associated with the wake up signal. For example, the UE 120*a* may be configured to transmit the wake up signal every 20 ms, every 100 ms, and so on.

Accordingly, the UE 120*b* may receive, from the UE 120*a*, the wake up signal that is associated with the UE 120*b* and with at least one additional UE (e.g., the UE 120*c*). Similarly, the UE 120*c* may receive, from the UE 120*a*, the wake up signal that is associated with the UE 120*c* and with at least one additional UE (e.g., the UE 120*b*).

In some aspects, as described above in connection with FIG. 6, the UE 120*a* may transmit the wake up signal in one or more wake up signal transmission occasions. For example, the UE 120*a* may transmit the wake up signal in one or more slots of a receiving resource pool (e.g., the resource pool including resource periods 605*a*, 605*b*, and/or 605*c*). For example, the UE 120*a* may transmit the wake up signal in one or more slots of a first half of a resource period of the receiving resource pool, such as a first slot, a second slot, and/or another slot. In some aspects, the UE 120a may be configured to transmit the wake up signal in the one or more slots of the receiving resource pool consistent with a definition of the receiving resource pool (e.g., in 3GPP specifications and/or another standard). Additionally, or alternatively, the UE 120a may determine the receiving resource pool based at least in part on a broadcast message from the UE 120b and/or the UE 120c, as described above.

In some aspects, as described above in connection with FIG. 5, the wake up signal may cause the plurality of second UEs to monitor for messages from the UE 120a during a time window. For example, the wake up signal may indicate the time window or activate a time window (e.g., defined in 3GPP specifications and/or another standard). Additionally, or alternatively, as described above in connection with FIG. 6, the UE 120a may transmit the wake up signal in one or more slots within a resource period of a receiving resource pool associated with the UE 120b and/or the UE 120c. For example, the UE 120b and/or the UE 120c may monitor for messages from the UE 120a within remaining slots of the resource period. As described above, the receiving resource pool may be defined within one or more technical specifications and/or may be configured by the UE 120b and/or the UE 120c and transmitted to the UE 120a in one or more broadcast messages from the UE 120b and/or the UE 120c, respectively. Additionally, or alternatively, the receiving resource pool may be configured by a base station (e.g., base station 110) and transmitted to the UE 120a from the UE 120b, the UE 120c, the base station 110, and/or an additional base station.

As described above in connection with FIG. 5, the UE 120b and/or the UE 120c may determine that the wake up signal is associated with the UE 120b and/or the UE 120c, respectively. For example, the wake up signal may include a message, and the UE 120b and/or the UE 120c may extract, from the message, information that is used to make the determination. Additionally, or alternatively, the wake up signal may include a sequence, and the UE 120b and/or the UE 120c may map the sequence to information that is used to make the determination.

In some aspects, the UE 120b and/or the UE 120c may determine that the wake up signal is associated with the UE 120b and/or the UE 120c, respectively, based at least in part on any of the information or identifiers that indicate the UE 120b and/or the UE 120c, as described above. For example, the UE 120b and/or the UE 120c may determine that the wake up signal is associated with the UE 120b and/or the UE 120c, respectively, based at least in part on the wake up signal being associated with a group identifier of a group of UEs including the UE 120b and/or the UE 120c, respectively. Additionally, or alternatively, the UE 120b and/or the UE 120c may determine that the wake up signal is associated with the UE 120b and/or the UE 120c, respectively, based at least in part on the wake up signal being associated with a UE identifier of the UE 120b and/or a UE identifier of the UE 120c, respectively. For example, the wake up signal may include a single UE identifier shared by the UE 120b and the UE 120c or may include a plurality of UE identifiers including a first UE identifier of the UE 120b and a second UE identifier of the UE 120c.

Additionally, or alternatively, the UE 120b and/or the UE 120c may determine that the wake up signal is associated with the UE 120b and/or the UE 120c, respectively, based at least in part on determining that the UE 120b and/or the UE 120c, respectively, is within a range of a location of the UE 120a. For example, as described above, the wake up signal may indicate the range and the location of the UE 120a; the UE 120b and/or the UE 120c may determine respectively distances based on the indicated location in the wake up signal and location of the UE 120b and/or the UE 120c, respectively; and the UE 120b and/or the UE 120c, respectively, may wake up when the respective distance is smaller than the indicated range. Additionally, or alternatively, the UE 120b and/or the UE 120c may determine that the wake up signal is associated with the UE 120b and/or the UE 120c, respectively, based at least in part on determining that the UE 120b and/or the UE 120c, respectively, is located with a geographic zone associated with the wake up signal. For example, as described above, the wake up signal may be based at least in part on an identifier of the geographic zone.

As shown by reference numbers 710a and 710b, the UE 120b (and also the UE 120c) may monitor for messages from the UE 120a based at least in part on receiving the wake up signal. For example, the UE 120b and/or the UE 120c may monitor for messages based at least in part on determining that the wake up signal is associated with the UE 120b and/or the UE 120c, respectively, as described above. In some aspects, as described above, the UE 120b and/or the UE 120c may monitor for messages from the UE 120a based on a time window indicated by the wake up signal and/or in remaining slots of a resource period (e.g., the resource periods 605a, 605b, and/or 605c, as described above in connection with FIG. 6).

In some aspects, the UE 120b and/or the UE 120c may determine that the wake up signal is not associated with the UE 120b and/or the UE 120c, respectively. For example, the UE 120b and/or the UE 120c may determine that the wake up signal is not associated with the UE 120b and/or the UE 120c, respectively, based at least in part on any of the information or identifiers that indicate the UE 120b and/or the UE 120c, as described above. Accordingly, the UE 120b and/or the UE 120c may discard the wake up signal based at least in part on determining that the wake up signal is not associated with the UE 120b and/or the UE 120c. For example, the UE 120b and/or the UE 120c may refrain from entering a DRX active state, as described above in connection with FIG. 5; refrain from monitor remaining slots of a resource period, as described above in connection with FIG. 6; and/or otherwise refrain from monitoring, transmitting, and/or receiving.

By broadcasting a single wake up signal for a plurality of other UEs (e.g., the UE 120b, the UE 120c, and/or another UE), as shown in FIG. 7 and described above, the UE 120a may conserve processing resources and network resources as compared with transmitting a plurality of wake up signals. In addition, the UE 120a may reduce latency by broadcasting a single wake up signal to the plurality of other UEs rather than transmitting a plurality of wake up signals at different times.

As indicated above, FIG. 7 is provided as an example. Other examples may differ from what is described with respect to FIG. 7.

FIGS. 8-12 are diagrams illustrating examples 800, 900, 1000, 1100, and 1200, respectively, of location-based transmission of a wake up signal, in accordance with the present disclosure. In some aspects, the communications shown in FIGS. 8-12 may occur via a sidelink interface, such as a PC5 interface.

Figure 8:
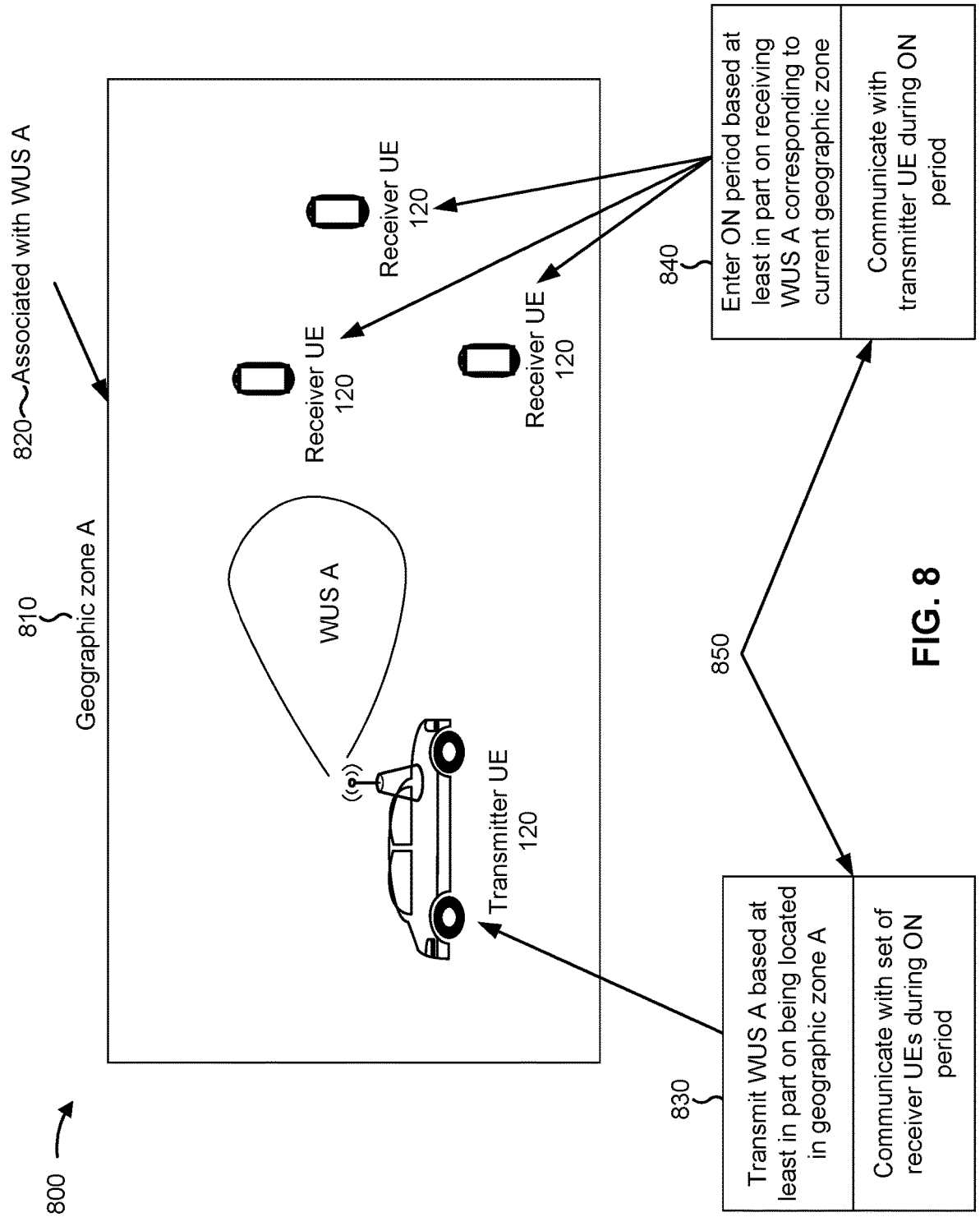
FIGS. 8, 9, 10, 11, and 12 are diagrams illustrating examples of location-based transmission of a wake up signal, in accordance with the present disclosure.

As shown in FIG. 8, example 800 includes a transmitter UE 120 and a set of receiver UEs 120 (e.g., one or more receiver UEs 120). Although shown as a V-UE, the transmitter UE 120 may include any UE 120. In some aspects, the set of receiver UEs 120 may include one or more V-UEs, one or more P-UEs, and/or one or more other types of UEs.

As further shown in FIG. 8, and by reference number 810, the transmitter UE 120 and the set of receiver UEs 120 may be located within a geographic zone designated as geographic zone A. A geographic zone may be a two-dimensional area or a three-dimensional space. A geographic zone may correspond to a zone as defined for NR V2X, or may be different than a zone as defined for NR V2X. For example, the partitioning of an area into geographic zones for the purpose of wake up signaling may be different than the partitioning of an area into geographic zones for other aspects of NR V2X communication. A two-dimensional geographic zone may enclose less than one square meter, one or more square meters, tens of square meters, hundreds of square meters, thousands of square meters, and so on. A three-dimensional geographic zone may enclose less than one cubic meter, one or more cubic meters, tens of cubic meters, hundreds of cubic meters, thousands of cubic meters, and so on. In some aspects, a geographic zone may be associated with an identifier (also referred to as a "zone identifier").

As shown by reference number 820, in some aspects, a geographic zone may be associated with a wake up signal. In example 800, geographic zone A is associated with wake up signal A. For example, a wake up signal associated with a geographic zone may be associated with a random-like sequence corresponding to the geographic zone (e.g., as described above in connection with FIG. 7). For example, the seed that initializes this sequence may be based at least in part on a zone identifier of the geographic zone.

As shown by reference number 830, the transmitter UE 120 may transmit wake up signal A to the set of receiver UEs 120. For example, the transmitter UE 120 may transmit wake up signal A based at least in part on transmitter UE 120 being located in geographic zone A. For example, the transmitter UE 120 may determine that the transmitter UE 120 is located in geographic zone A based at least in part on a location service of the transmitter UE 120 (e.g., a global positioning system (GPS) service, a GNSS service, a cellular location service, and/or another location service).

As shown by reference number 840, the set of receiver UEs 120 may enter an ON period of a DRX cycle based at least in part on receiving wake up signal A. For example, the set of receiver UEs 120 may determine that wake up signal A was generated using a seed corresponding to a current geographic zone in which the set of receiver UEs 120 are located, and may enter the ON period based at least in part on this determination. In example 800, were a UE located outside of geographic zone A to receive wake up signal A, that UE may not enter the ON period since wake up signal A does not correspond to a current geographic zone of the UE. It should be noted that different receiver UEs 120 of example 800 may be associated with different WUS cycles. For example, the WUS cycles of the receiver UEs 120 of example 800 may or may not be aligned with each other. Thus, the transmitter UE 120 may transmit one or more wake up signal As based at least in part on the WUS cycles of the receiver UEs 120 that are to receive the wake up signals. By using the wake up signal A corresponding to geographic area A, the transmitter UE 120 does not need to explicitly identify each individual receiver UE 120 within geographic zone A, thereby conserving signaling resources associated with identifying each individual receiver UE 120 of the set of receiver UEs 120.

In some aspects, the transmitter UE 120 may communicate with the set of receiver UEs 120 to determine respective WUS occasions of the set of receiver UEs 120. Additionally, or alternatively, the transmitter UE 120 may use a WUS occasion that is common to UEs 120 located within geographic zone A, as described elsewhere herein.

As shown by reference number 850, the transmitter UE 120 and the set of receiver UEs 120 may communicate with each other during the ON period. For example, the transmitter UE 120 may transmit a PDCCH message and/or another type of message to the set of receiver UEs 120 during the ON period.

Figure 9:
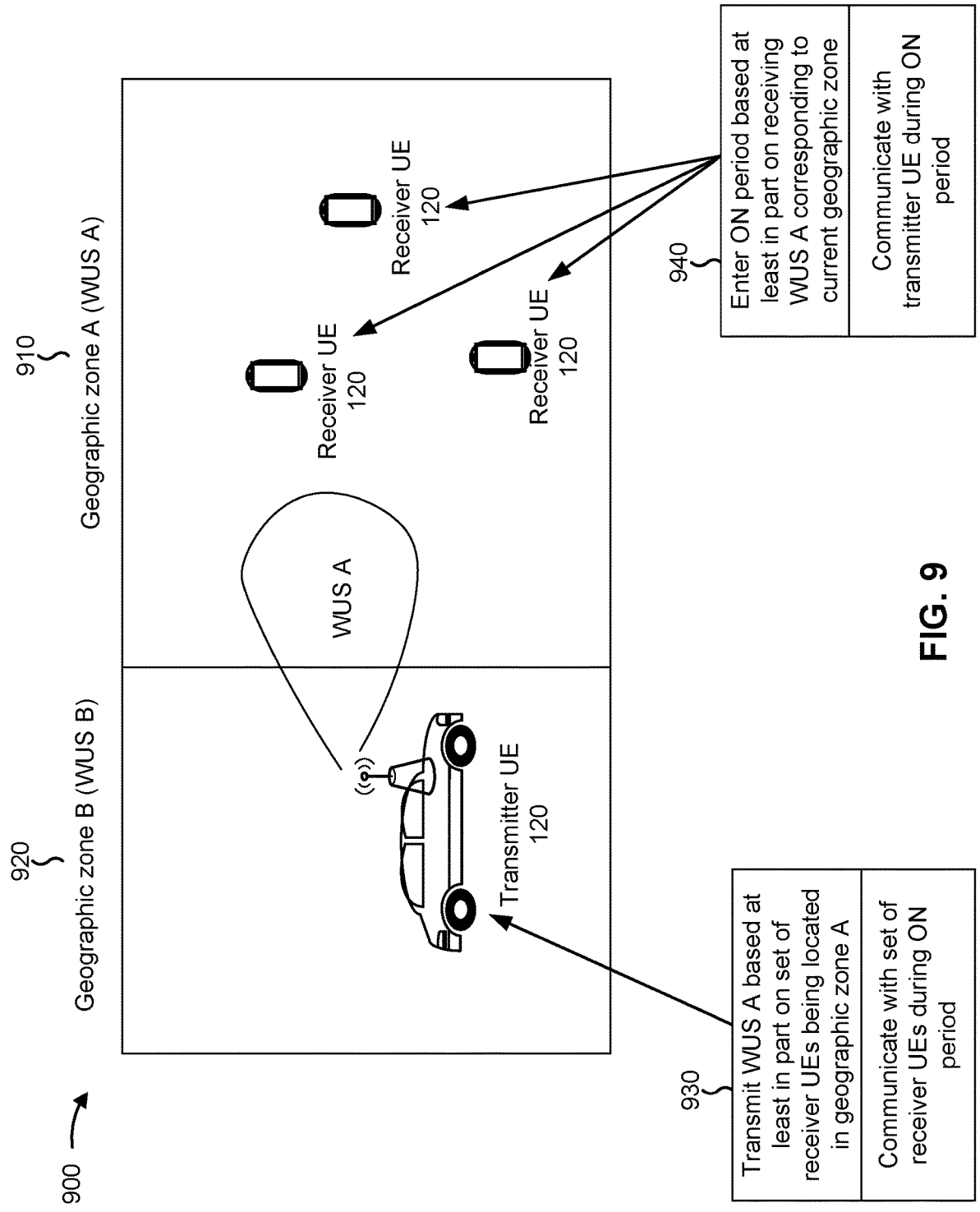

Example 900 of FIG. 9 is an example where the set of receiver UEs 120 are located in a first geographic zone (shown by reference number 910 and referred to as geographic zone A), and the transmitter UE 120 is located in a second geographic zone (shown by reference number 920 and referred to as geographic zone B). As shown, geographic zone A is associated with a wake up signal A and geographic zone B is associated with a wake up signal B. For example, wake up signal A and wake up signal B may be generated based at least in part on the corresponding geographic zones (e.g., as described above in connection with FIG. 7).

As shown by reference number 930, the transmitter UE 120 may transmit wake up signal A to the set of receiver UEs 120. For example, the transmitter UE 120 may transmit wake up signal A based at least in part on the set of receiver UEs 120 being located in geographic zone A. Accordingly, when the transmitter UE 120 is moving from geographic zone B toward geographic zone A, the transmitter UE 120 can communicate with receiver UEs 120 located in geographic zone A and not in geographic zone B, thereby conserving communication resources and power of receiver UEs in geographic zone B.

As shown by reference number 940, the set of receiver UEs 120 may enter an ON period of the DRX mode based at least in part on receiving wake up signal A corresponding to the current geographic zone of the set of receiver UEs 120 (e.g., geographic zone A). As further shown, the transmitter UE 120 and the set of receiver UEs 120 may communicate in the ON period.

Figure 10:
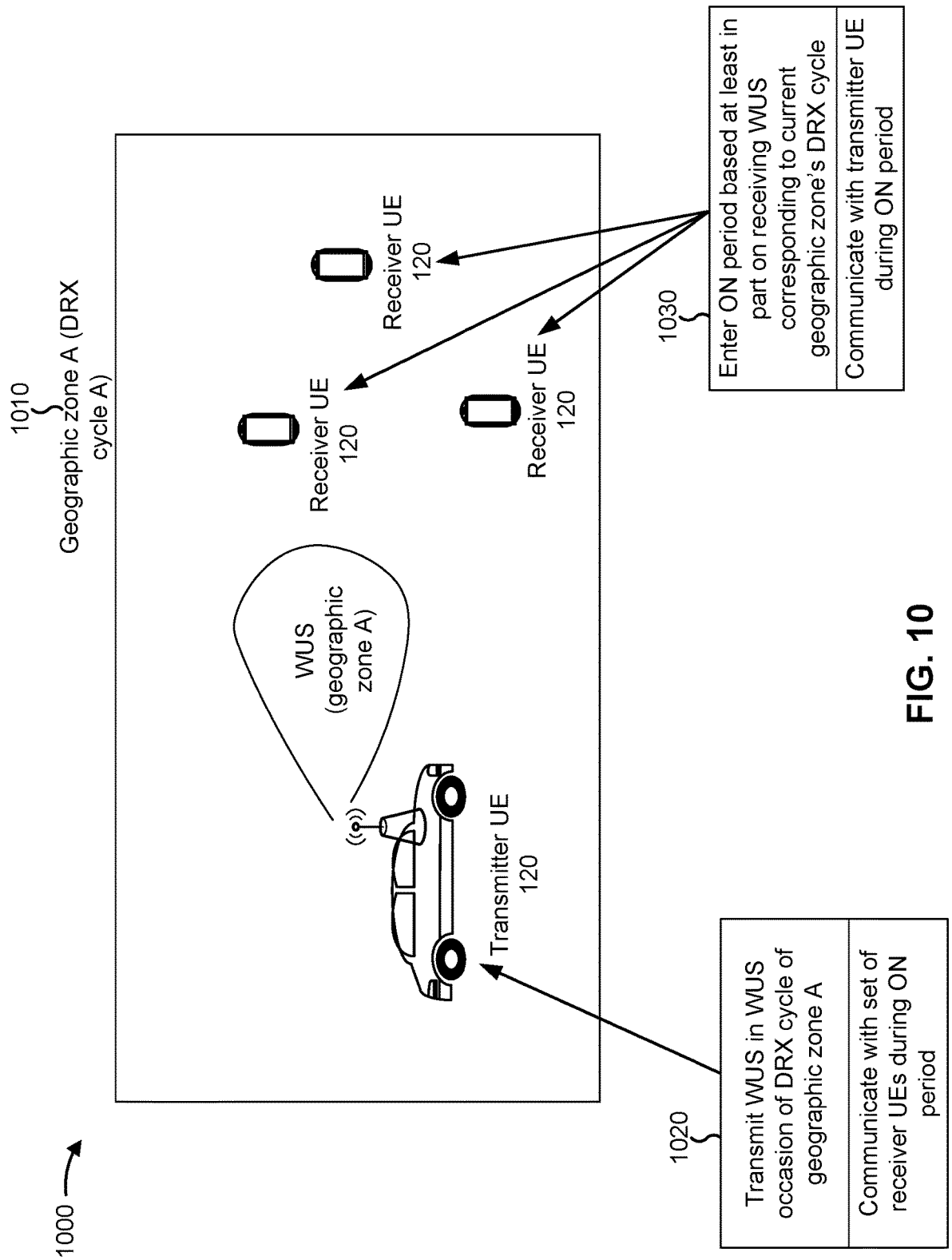

Example 1000 of FIG. 10 is an example where receiver UEs 120 located within a geographic zone (e.g., geographic zone A, shown by reference number 1010) use a same DRX cycle. For example, the DRX cycle for a given geographic zone may have WUS occasions at configured times so that all receiver UEs 120 located within the given geographic zone receive a wake up signal when the wake up signal is transmitted within a WUS occasion of the DRX cycle for the given geographic zone. For example, as shown by reference number 1020, the transmitter UE 120 may transmit a wake up signal in a WUS occasion of the DRX cycle of geographic zone A (e.g., based at least in part on the transmitter UE 120 being located within geographic zone A and/or based at least in part on the set of receiver UEs 120 being located within geographic zone A).

As shown by reference number 1030, the set of receiver UEs 120 may enter a DRX ON period based at least in part on receiving the wake up signal in the WUS occasion of the DRX cycle of geographic zone A. As further shown, the transmitter UE 120 and the set of receiver UEs 120 may communicate with each other during the ON period corresponding to the wake up signal. In this way, the set of receiver UEs 120 may use a same DRX cycle such that the transmitter UE 120 does not need to determine individual WUS occasions for the set of UEs 120 prior to transmitting a wake up signal, thereby conserving communication resources and reducing overhead. In some aspects, the transmitter UE 120 may also use a wake up signal corresponding to the geographic zone such that the transmitter UE 120 does not need to communicate with each receiver UE 120 to determine an identity of each receiver UE 120 for paging, which conserves communication resources and reduces overhead.

In some aspects, neighboring geographic zones may have different DRX cycles. For example, referring back to FIG. 9, geographic zone A and geographic zone B may be associated with DRX cycles that have WUS occasions at different times. Configuring neighboring geographic zones for different DRX cycles reduces network congestion and reduces the likelihood of inadvertent awakening of receiver UEs outside of the desired geographic zone.

Figure 11:
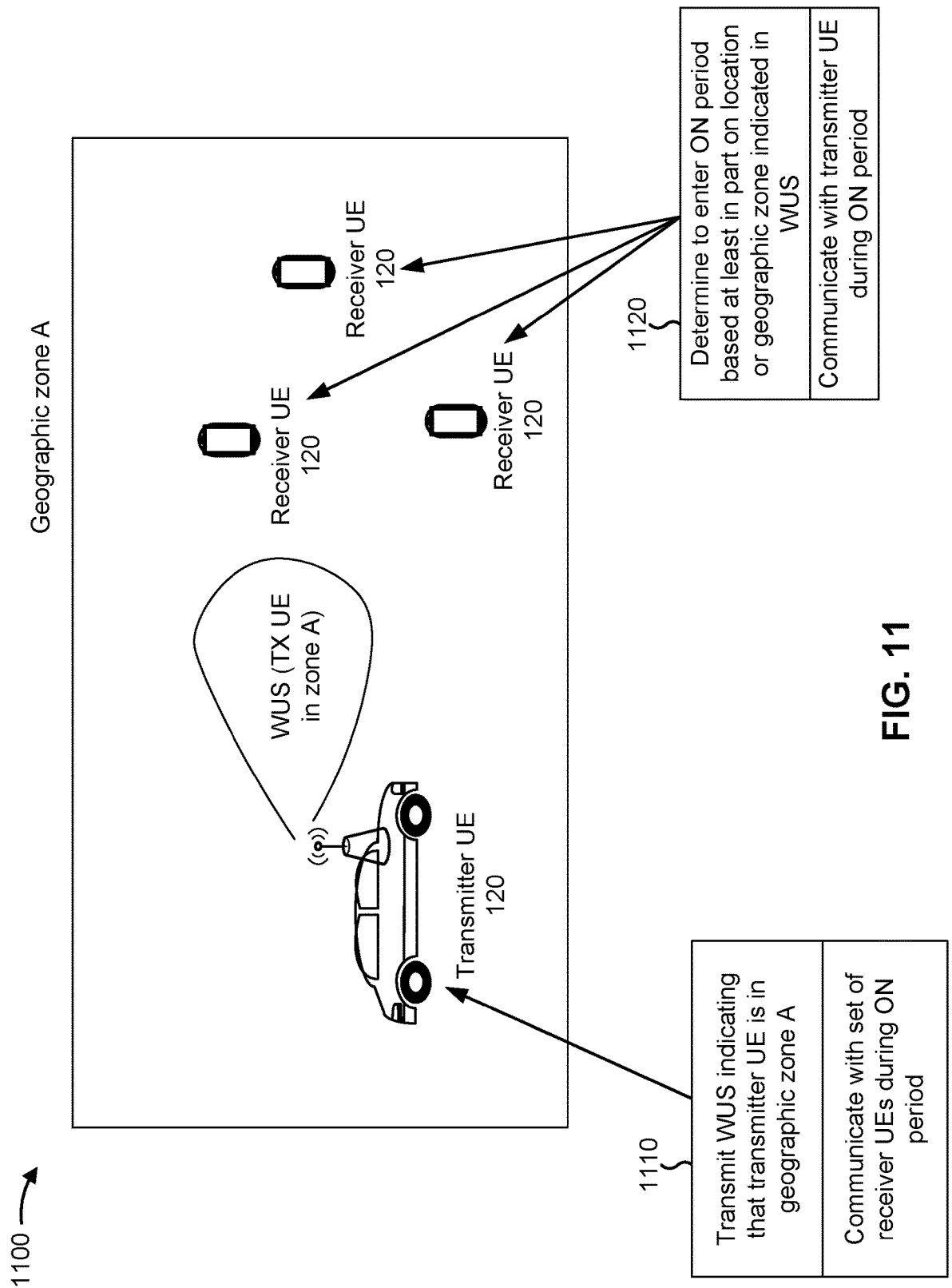

Example 1100, shown in FIG. 11, shows an example where the wake up signal transmitted by the transmitter UE 120 indicates a location of the transmitter UE 120. For example, as shown by reference number 1110, the transmitter UE 120 may transmit a wake up signal. As shown, the wake up signal may indicate that the transmitter UE 120 is located in geographic zone A. For example, the wake up signal may indicate and/or be generated based at least in part on a zone identifier associated with a geographic zone in which the transmitter UE 120 is located (e.g., as described above in connection with FIG. 7). In some aspects, the wake up signal may include information indicating a location of the transmitter UE 120, such as coordinates of the transmitter UE 120.

As shown by reference number 1120, a receiver UE 120, of the set of receiver UEs 120, may determine whether to enter an ON period of a DRX cycle based at least in part on the location (e.g., geographic zone) indicated by the corresponding wake up signal. For example, the receiver UE 120 may determine whether to enter the ON period based at least in part on whether the transmitter UE 120 is located a threshold distance from the receiver UE 120, is located in a different geographic area than the receiver UE 120, and/or is located in a non-neighboring geographic area relative to the receiver UE 120. Thus, the receiver UE 120 may determine whether to enter an ON period and receive a subsequent message from the transmitter UE 120 based at least in part on the location of the transmitter UE 120. Selectively receiving the subsequent communication may conserve resources of the receiver UE 120 that would otherwise be used to receive a message that is not of practical use to the receiver UE 120 or is unlikely to be decodable to the receiver UE 120. As further shown, the receiver UE 120 and the transmitter UE 120 may communicate during the ON period (when the receiver UE 120 determines to enter the ON period based at least in part on the location of the transmitter UE 120).

Figure 12:
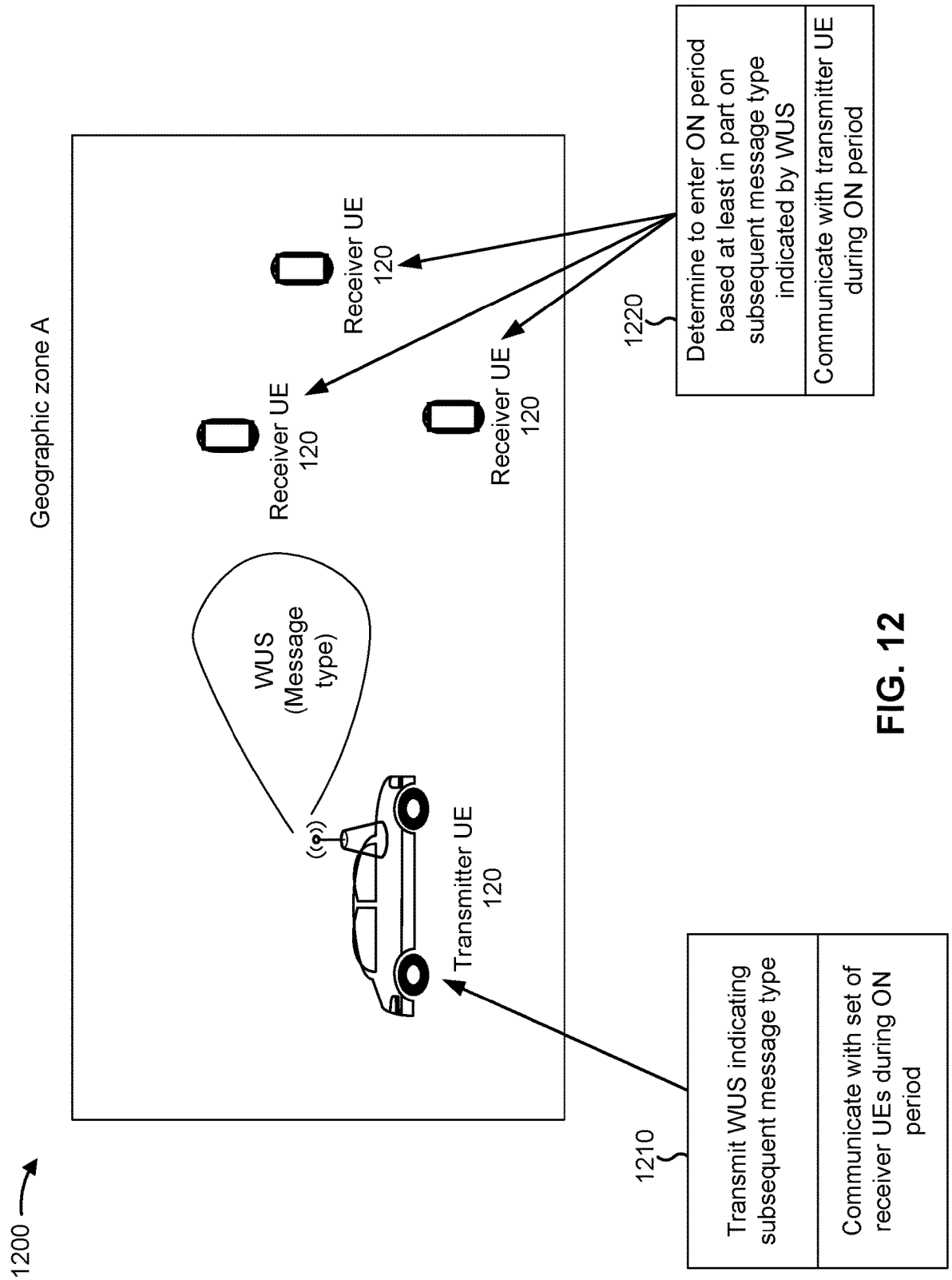

Example 1200 of FIG. 12 shows an example where the wake up signal indicates a message type of a message associated with the wake up signal. For example, as shown by reference number 1210, the wake up signal may indicate a subsequent message type (e.g., whether the subsequent message is a BSM or another type of message, a specific message type of the subsequent message, and/or a message priority of the subsequent message).

As shown by reference number 1220, the set of receiver UEs 120 may determine whether to enter an ON period based at least in part on the subsequent message type indicated by the wake up signal. For example, when the wake up signal indicates an incoming transmission of a BSM, a receiver UE 120 may enter the ON period. Thus, the receiver UE 120 may determine whether to enter an ON period based at least in part on a message type. This may be useful, for example, when an incoming transmission may be difficult to receive (e.g., due to a small received power) but is associated with a high priority and/or important information such that the receiver UE 120 attempts to receive the incoming transmission despite the low chance of successful reception and decoding.

Examples 800, 900, 1000, 1100, and/or 1200 may be combined with example 700. For example, the group wake up signal described in connection with example 700 may be generated and/or transmitted as described in connection with one or more of FIGS. 8-12. Additionally, the operations described with regard to examples 800, 900, 1000, 1100, and 1200 can be combined with each other in various fashions. As just one example, the operations described with regard to FIG. 12 can be applied in combination with any one or more of the operations described with regard to examples 800, 900, 1000, and 1100.

As indicated above, FIGS. 8-12 are provided as examples. Other examples may differ from what is described with regard to FIGS. 8-12.

Figure 13:
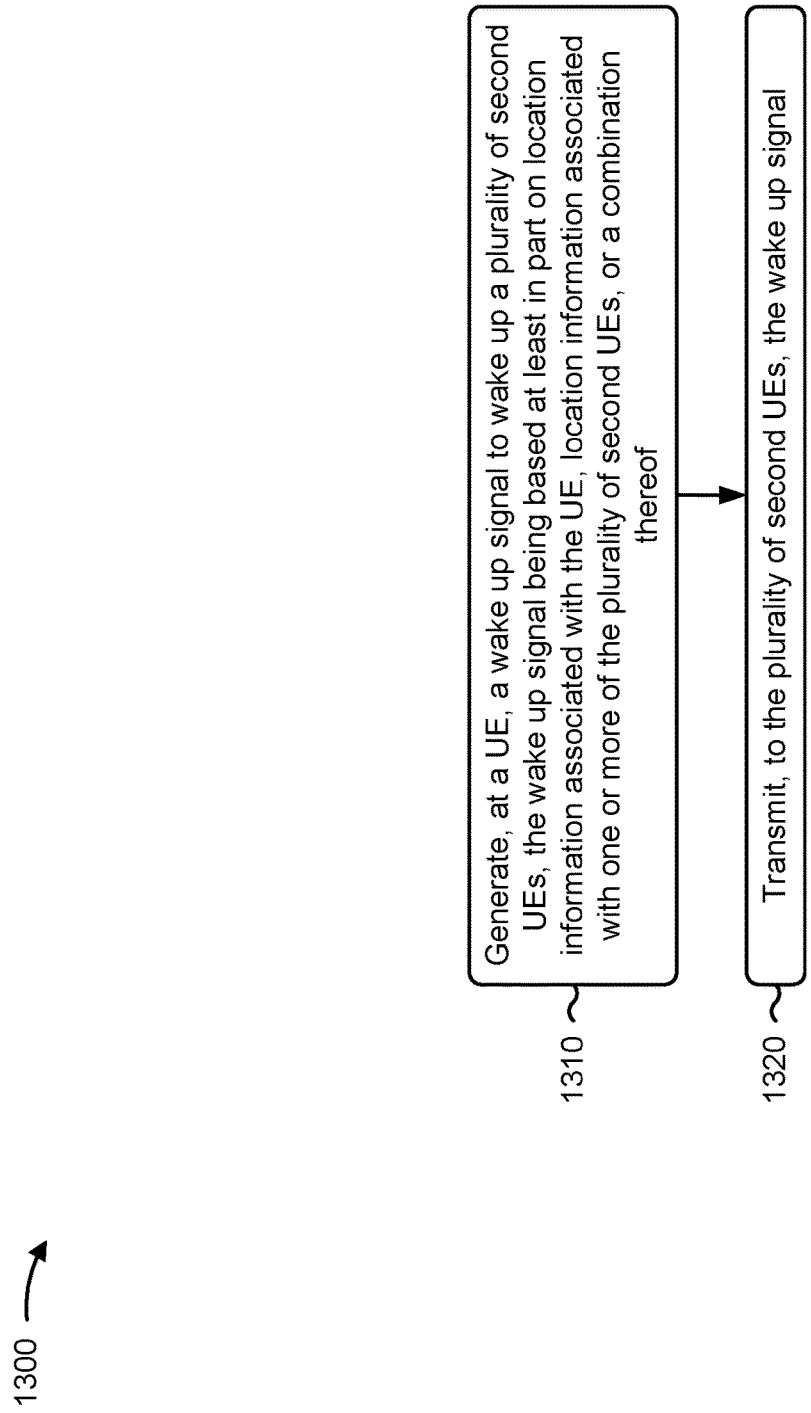
FIGS. 13 and 14 are diagrams illustrating example processes performed by a UE, in accordance with the present disclosure.

FIG. 13 is a diagram illustrating an example process 1300 performed, for example, by a transmitter UE, in accordance with the present disclosure. Example process 800 is an example where the UE (e.g., UE 120*a* and/or apparatus 1500 of FIG. 15) performs operations associated with transmitting group wake up signals.

As shown in FIG. 13, in some aspects, process 1300 may include generating a wake up signal to wake up a plurality of second UEs (block 1310). For example, the UE (e.g., using generation component 1510, depicted in FIG. 15) may generate the wake up signal to wake up the plurality of second UEs, as described above. In some aspects, the wake up signal is based at least in part on location information associated with the UE, location information associated with one or more of the plurality of second UEs, or a combination thereof.

As further shown in FIG. 13, in some aspects, process 1300 may include transmitting, to the plurality of second UEs, the wake up signal (block 1320). For example, the UE (e.g., using transmission component 1504, depicted in FIG. 15) may transmit the wake up signal, as described above.

Process 1300 may include additional aspects, such as any single aspect or any combination of aspects described below and/or in connection with one or more other processes described elsewhere herein.

In a first aspect, the UE transmits the wake up signal in one or more wake up signal transmission occasions.

In a second aspect, alone or in combination with the first aspect, the UE comprises at least one of a V-UE, an RSU, or a combination thereof.

In a third aspect, alone or in combination with one or more of the first and second aspects, the plurality of second UEs comprise at least one of a P-UE, a V-UE, or a combination thereof.

In a fourth aspect, alone or in combination with one or more of the first through third aspects, the UE transmits the wake up signal based at least in part on a periodicity associated with the wake up signal.

In a fifth aspect, alone or in combination with one or more of the first through fourth aspects, the wake up signal causes the plurality of second UEs to monitor for messages from the UE during a time window.

In a sixth aspect, alone or in combination with one or more of the first through fifth aspects, the UE transmits the wake up signal in one or more slots within a receiving resource pool associated with the plurality of second UEs.

In a seventh aspect, alone or in combination with one or more of the first through sixth aspects, the wake up signal comprises at least one of SCI, a MAC-CE, or a combination thereof.

In an eighth aspect, alone or in combination with one or more of the first through seventh aspects, the wake up signal comprises at least one sequence.

In a ninth aspect, alone or in combination with one or more of the first through eighth aspects, the wake up signal includes a message with information that indicates the plurality of second UEs.

In a tenth aspect, alone or in combination with one or more of the first through ninth aspects, the wake up signal includes a sequence that is based at least in part on information that indicates the plurality of second UEs.

In an eleventh aspect, alone or in combination with one or more of the first through tenth aspects, the wake up signal is based at least in part on an identifier of a geographic zone, and the wake up signal informs the plurality of second UEs to wake up when located within the geographic zone.

In a twelfth aspect, alone or in combination with one or more of the first through thirteenth aspects, the plurality of second UEs use a same DRX cycle corresponding to the geographic zone.

In a thirteenth aspect, alone or in combination with one or more of the first through twelfth aspects, the wake up signal uses a sequence generated based at least in part on a seed corresponding to the geographic zone.

In a fourteenth aspect, alone or in combination with one or more of the first through thirteenth aspects, the geographic zone is a first geographic zone, and the UE is located in a second geographic zone different than the first geographic zone.

In a fifteenth aspect, alone or in combination with one or more of the first through fourteenth aspects, process 1300 further includes determining (e.g., using determination component 1508, depicted in FIG. 15) that the UE is to move from the second geographic zone to the first geographic zone, where the wake up signal is transmitted based at least in part on the determination.

In a sixteenth aspect, alone or in combination with one or more of the first through fifteenth aspects, the first geographic zone is associated with a first DRX cycle, and the second geographic zone neighbors the first geographic zone and is associated with a second DRX cycle different than the first DRX cycle.

In a seventeenth aspect, alone or in combination with one or more of the first through sixteenth aspects, the geographic zone is based, at least in part, on at least one of a location of the UE, a heading of the UE, a speed of the UE, or a combination thereof.

In an eighteenth aspect, alone or in combination with one or more of the first through seventeenth aspects, the wake up signal is based at least in part on a message type to be transmitted to the plurality of second UEs.

Figure 15:
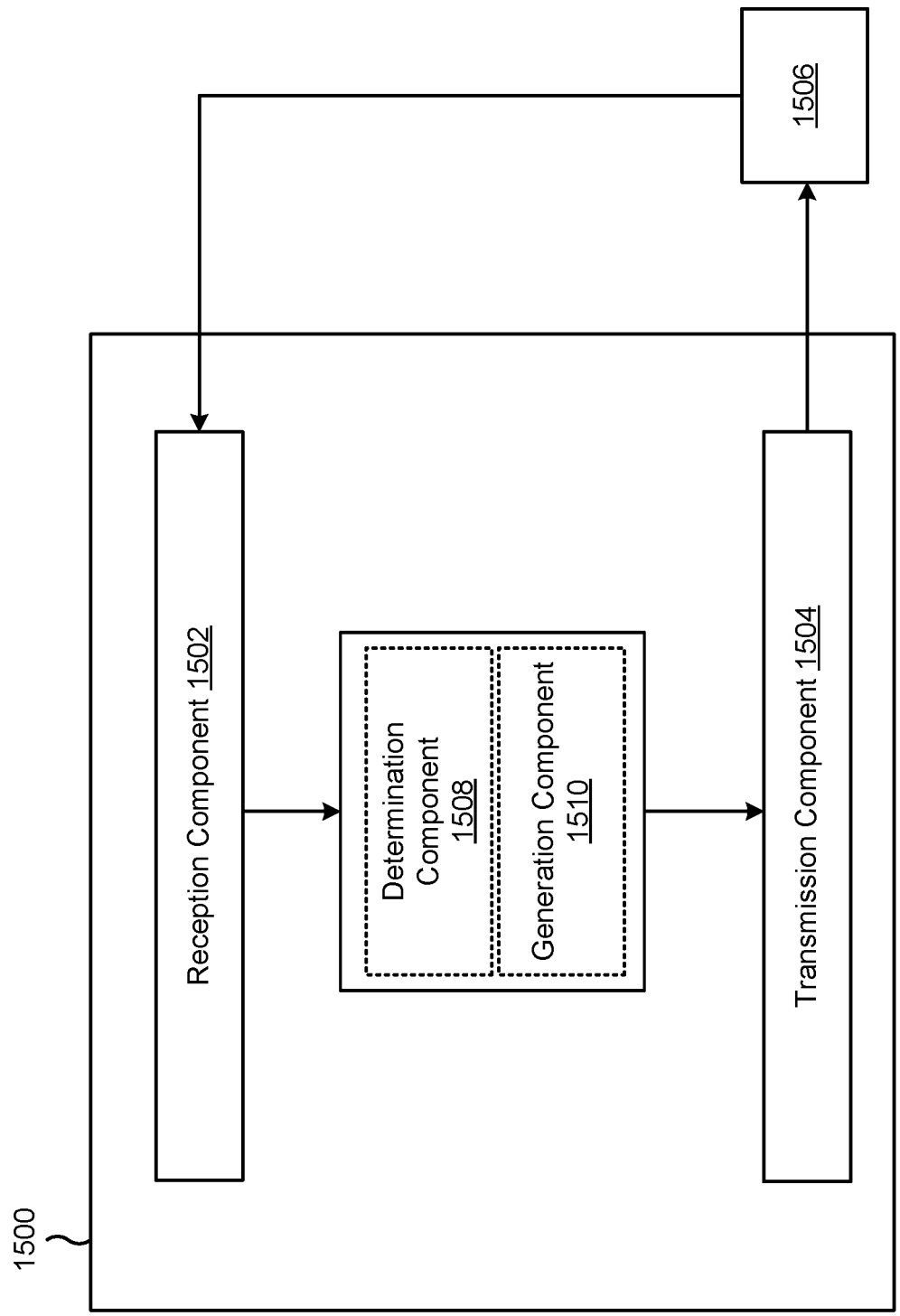
FIGS. 15 and 16 are block diagrams of example apparatuses for wireless communication, in accordance with the present disclosure.

In a nineteenth aspect, alone or in combination with one or more of the first through eighteenth aspects, process 1300 further includes communicating (e.g., using transmission component 1504 and/or reception component 1502, depicted in FIG. 15) with the plurality of second UEs during an ON period of a DRX mode, where the ON period is associated with the wake up signal.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
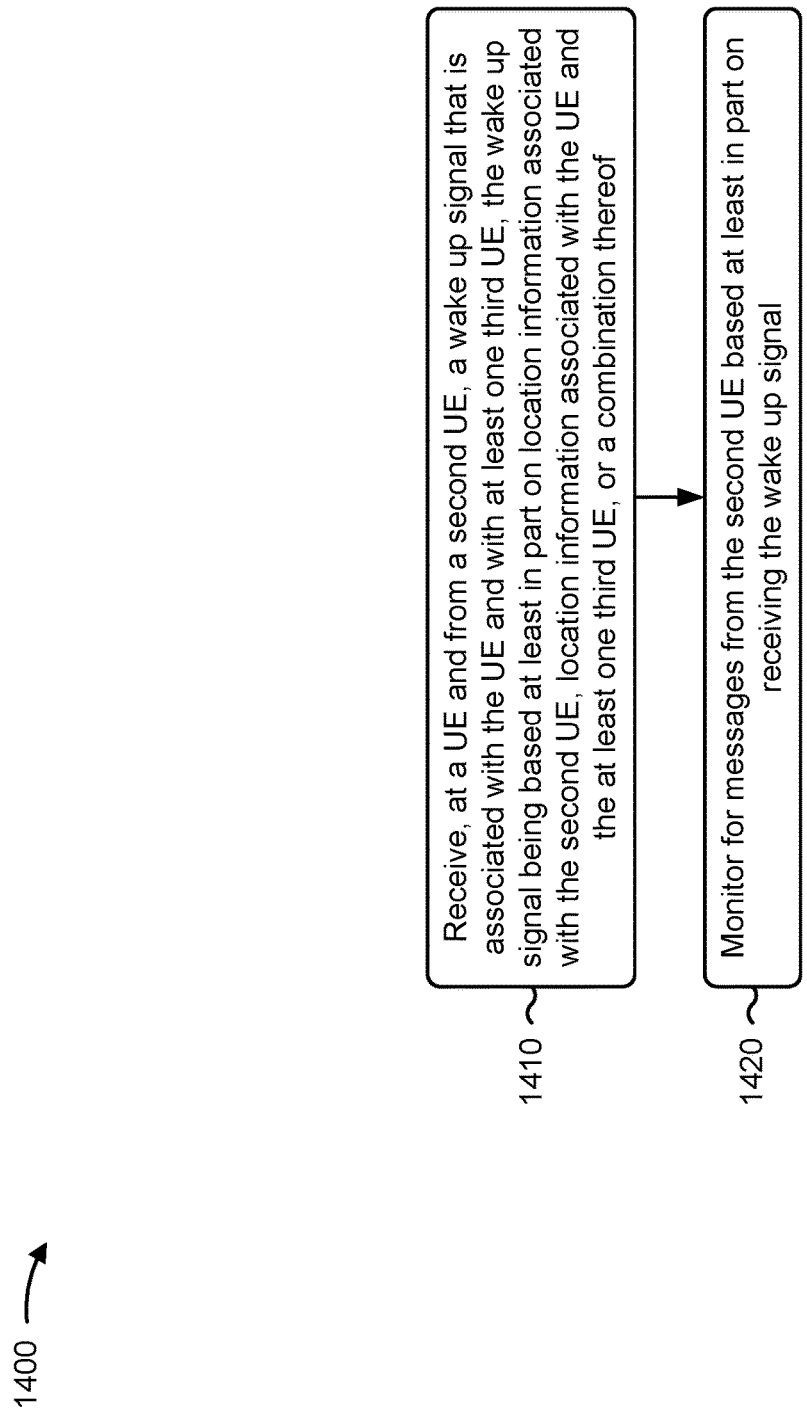

FIG. 14 is a diagram illustrating an example process 1400 performed, for example, by a receiver UE, in accordance with the present disclosure. Example process 1400 is an example where the UE (e.g., UE 120*b*, UE 120*c*, and/or apparatus 1600 of FIG. 16) performs operations associated with receiving group wake up signals.

As shown in FIG. 14, in some aspects, process 1400 may include receiving, from a second UE (e.g., UE 120*a* and/or apparatus 1500 of FIG. 15), a wake up signal that is associated with the UE and with at least one third UE (block 1410). For example, the UE (e.g., using reception component 1602, depicted in FIG. 16) may receive the wake up signal that is associated with the UE and with the at least one third UE, as described above. In some aspects, the wake up signal is based at least in part on location information associated with the second UE, location information associated with the UE and the at least one third UE, or a combination thereof.

As further shown in FIG. 14, in some aspects, process 1400 may include monitoring for messages from the second UE based at least in part on receiving the wake up signal (block 1420). For example, the UE (e.g., using reception component 1602) may monitor for messages from the second UE based at least in part on receiving the wake up signal, as described above.

Process 1400 may include additional aspects, such as any single aspect or any combination of aspects described below and/or in connection with one or more other processes described elsewhere herein.

In a first aspect, the UE receives the wake up signal in one or more wake up signal transmission occasions.

In a second aspect, alone or in combination with the first aspect, the UE comprises at least one of a P-UE, a V-UE, or a combination thereof.

In a third aspect, alone or in combination with one or more of the first and second aspects, the second UE comprises at least one of a V-UE, an RSU, or a combination thereof.

In a fourth aspect, alone or in combination with one or more of the first through third aspects, the UE monitors for messages from the second UE within a time window based at least in part on the wake up signal.

In a fifth aspect, alone or in combination with one or more of the first through fourth aspects, the UE receives the wake up signal in one or more slots within a receiving resource pool, and the UE monitors for messages from the second UE within remaining slots of the receiving resource pool.

In a sixth aspect, alone or in combination with one or more of the first through fifth aspects, the wake up signal comprises at least one of SCI, a MAC-CE, or a combination thereof.

In a seventh aspect, alone or in combination with one or more of the first through sixth aspects, the wake up signal comprises at least one sequence.

In an eighth aspect, alone or in combination with one or more of the first through seventh aspects, the wake up signal includes a message with information that indicates the UE and the at least one third UE.

In a ninth aspect, alone or in combination with one or more of the first through eighth aspects, the wake up signal includes a sequence that the UE maps to information that indicates the UE and the at least one third UE.

In a tenth aspect, alone or in combination with one or more of the first through ninth aspects, process 1400 further includes determining (e.g., using determination component 1608, depicted in FIG. 16) that the wake up signal is associated with the UE, such that the UE monitors for messages from the second UE based at least in part on determining that the wake up signal is associated with the UE.

In an eleventh aspect, alone or in combination with one or more of the first through nineteenth aspects, the UE determines that the wake up signal is associated with the UE based at least in part on determining that the UE is located with a geographic zone associated with the wake up signal, where the wake up signal is based at least in part on an identifier of the geographic zone.

In a twelfth aspect, alone or in combination with one or more of the first through thirteenth aspects, the UE uses a DRX cycle corresponding to the geographic zone.

In a thirteenth aspect, alone or in combination with one or more of the first through twelfth aspects, the wake up signal uses a sequence generated based at least in part on a seed corresponding to the geographic zone.

In a fourteenth aspect, alone or in combination with one or more of the first through thirteenth aspects, process 1400 further includes determining (e.g., using determination component 1608, depicted in FIG. 16) to enter an ON period of a DRX mode based at least in part on the wake up signal and the geographic zone.

In a fifteenth aspect, alone or in combination with one or more of the first through fourteenth aspects, the geographic zone is a first geographic zone, and the second UE is located in a second geographic zone different than the first geographic zone.

In a sixteenth aspect, alone or in combination with one or more of the first through seventeenth aspects, the first geographic zone is associated with a first DRX cycle, and the second geographic zone neighbors the first geographic zone and is associated with a second DRX cycle different than the first DRX cycle.

In a seventeenth aspect, alone or in combination with one or more of the first through sixteenth aspects, process 1400 further includes determining (e.g., using determination component 1608) to enter an ON period of a DRX mode based at least in part on the wake up signal and the second geographic zone.

In an eighteenth aspect, alone or in combination with one or more of the first through seventeenth aspects, the wake up signal is based at least in part on a message type to be received by the UE.

In a nineteenth aspect, alone or in combination with one or more of the first through eighteenth aspects, process 1400 further includes determining (e.g., using determination component 1608) to enter an ON period of a DRX mode based at least in part on the wake up signal and the message type.

Figure 16:
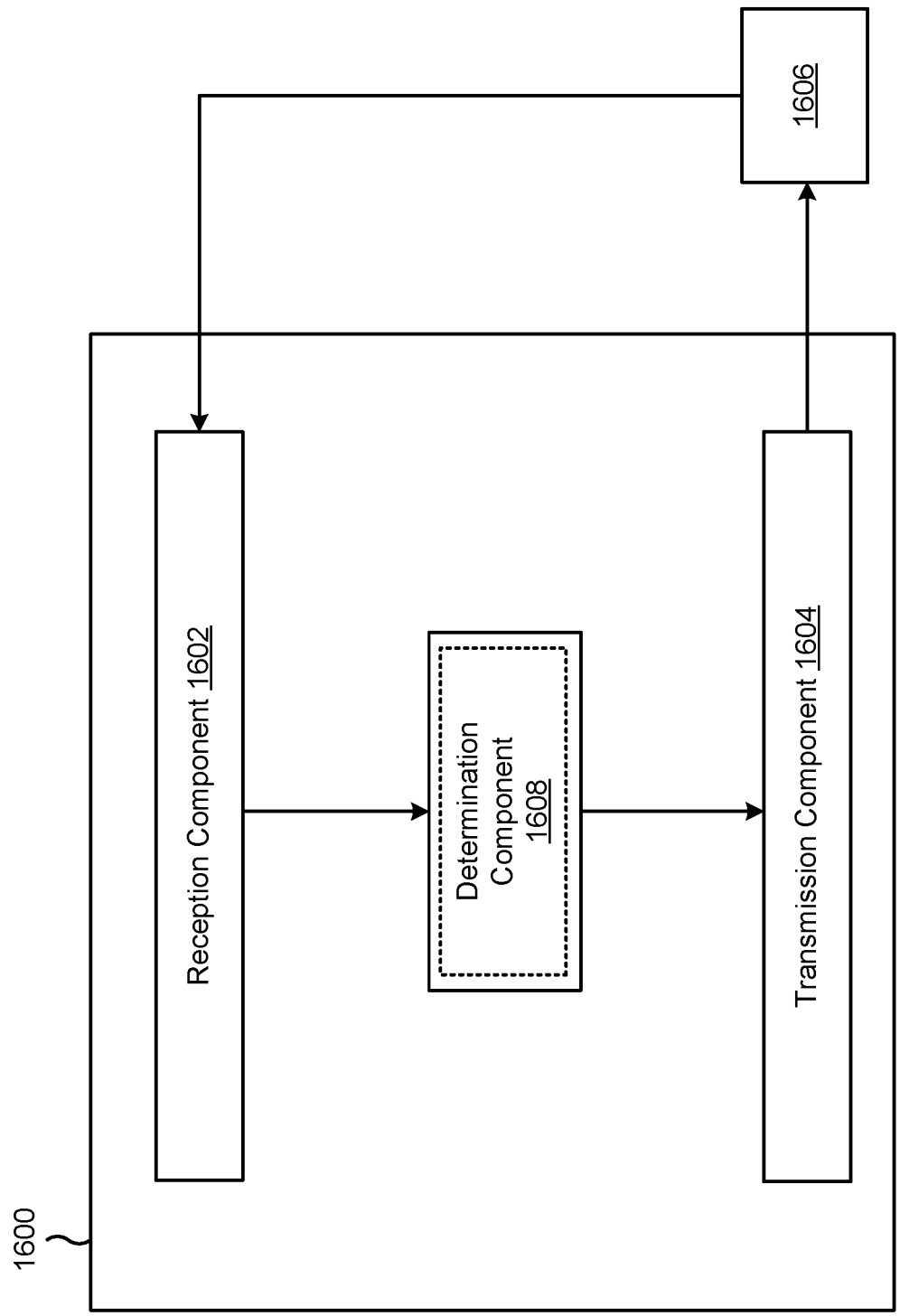

In a twentieth aspect, alone or in combination with one or more of the first through nineteenth aspects, process 1400 further includes communicating (e.g., using transmission component 1604 and/or reception component 1602, depicted in FIG. 16) with the plurality of second UEs during an ON period of a DRX mode, where the ON period is associated with the wake up signal.

In a twenty-first aspect, alone or in combination with one or more of the first through twentieth aspects, process 1400 further includes determining (e.g., using determination component 1608) that the wake up signal is not associated with the UE and discarding the wake up signal based at least in part on determining that the wake up signal is not associated with the UE.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a block diagram of an example apparatus 1500 for wireless communication. The apparatus 1500 may be a transmitter UE, or a transmitter UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a determination component 1508 or a generation component 1510, among other examples.

In some aspects, the apparatus 1500 may be configured to perform one or more operations described herein in connection with FIGS. 6-12. Additionally or alternatively, the apparatus 1500 may be configured to perform one or more processes described herein, such as process 1300 of FIG. 13. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

In some aspects, the generation component 1510 (e.g., including a modulator, a transmit MIMO processor, a transmit processor, a controller/processor, a memory, or a combination thereof, of the UE described above in connection with FIG. 2) may generate a wake up signal to wake up a plurality of UEs (e.g., including apparatus 1506). For example, the wake up signal may be based at least in part on location information associated with the apparatus 1500, location information associated with the apparatus 1506, or a combination thereof. Accordingly, the transmission component 1504 may transmit the wake up signal to the plurality of UEs. In some aspects, the determination component 1508 (e.g., including a MIMO detector, a receive processor, a transmit MIMO processor, a transmit processor, a controller/processor, a memory, or a combination thereof, of the UE described above in connection with FIG. 2) may determine that the apparatus 1500 is to move from a second geographic zone to a first geographic zone, such that the transmission component 1504 transmits the wake up signal based at least in part on the determination.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

FIG. 16 is a block diagram of an example apparatus 1600 for wireless communication. The apparatus 1600 may be a receiver UE, or a receiver UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a determination component 1608.

In some aspects, the apparatus 1600 may be configured to perform one or more operations described herein in connection with FIGS. 6-12. Additionally or alternatively, the apparatus 1600 may be configured to perform one or more processes described herein, such as process 1400 of FIG. 14. In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be co-located with the reception component 1602 in a transceiver.

In some aspects, the reception component 1602 may receive, from a UE (e.g., the apparatus 1606), a wake up signal that is associated with the apparatus 1600 and at least one other UE. For example, the wake up signal may be based at least in part on location information associated with the apparatus 1606, location information associated with the apparatus 1600, or a combination thereof. Accordingly, the reception component 1602 may monitor for messages from the apparatus 1606 based at least in part on receiving the wake up signal. Additionally, in some aspects, the transmission component 1604 may communicate with the apparatus 1606 during an ON period of a DRX mode, the ON period being associated with the wake up signal.

In some aspects, the determination component 1608 may determine whether to enter an ON period of a DRX mode based at least in part on the wake up signal and a geographic zone of the apparatus 1606. Additionally, or alternatively, the determination component 1608 may determine whether to enter the ON period based at least in part on the wake up signal and a geographic zone of the apparatus 1600. Additionally, or alternatively, the determination component 1608 may determine whether to enter the ON period based at least in part on a message type to be received by the reception component 1602.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: generating a wake up signal to wake up a plurality of second UEs; and transmitting, to the plurality of second UEs, the wake up signal.

Aspect 2: The method of Aspect 1, wherein the UE transmits the wake up signal in one or more wake up signal transmission occasions.

Aspect 3: The method of any of Aspects 1 through 2, wherein the UE comprises at least one of a vehicle UE (V-UE), a road side unit (RSU), or a combination thereof.

Aspect 4: The method of any of Aspects 1 through 3, wherein the plurality of second UEs comprise at least one of a pedestrian UE (P-UE), a vehicle UE (V-UE), or a combination thereof.

Aspect 5: The method of any of Aspects 1 through 4, further comprising: receiving, from at least one of the plurality of second UEs, a broadcast message including information that identifies the at least one of the plurality of second UEs, wherein the UE transmits the wake up signal based at least in part on receiving the broadcast message.

Aspect 6: The method of any of Aspects 1 through 5, wherein the UE transmits the wake up signal based at least in part on a periodicity associated with the wake up signal.

Aspect 7: The method of any of Aspects 1 through 6, wherein the wake up signal causes the plurality of second UEs to monitor for messages from the UE during a time window.

Aspect 8: The method of any of Aspects 1 through 7, wherein the UE transmits the wake up signal in one or more slots within a receiving resource pool associated with the plurality of second UEs.

Aspect 9: The method of any of Aspects 1 through 8, wherein the wake up signal is based at least in part on one or more of: a group identifier associated with a group including the plurality of second UEs; location information associated with the UE; location information associated with one or more of the plurality of second UEs; a UE identifier associated with the UE; one or more UE identifiers associated with the plurality of second UEs; or a combination thereof.

Aspect 10: The method of any of Aspects 1 through 9, wherein the wake up signal comprises at least one of sidelink control information (SCI), a medium access control (MAC) layer control element (MAC-CE), or a combination thereof.

Aspect 11: The method of Aspect 10, wherein the wake up signal includes a message with information that indicates the plurality of second UEs.

Aspect 12: The method of any of Aspects 1 through 9, wherein the wake up signal comprises at least one sequence.

Aspect 13: The method of Aspect 12, wherein the wake up signal includes a sequence that is based at least in part on information that indicates the plurality of second UEs.

Aspect 14: The method of any of Aspects 1 through 13, wherein the plurality of second UEs form a group based at least in part on geographic locations of the plurality of second UEs.

Aspect 15: The method of any of Aspects 1 through 14, wherein the plurality of second UEs are associated with a group identifier.

Aspect 16: The method of Aspect 15, further comprising: receiving, from at least one of the plurality of second UEs, the group identifier.

Aspect 17: The method of any of Aspects 1 through 16, further comprising: receiving, from one or more of the plurality of second UEs, one or more indicators of one or more locations of the one or more of the plurality of second UEs, wherein the UE transmits the wake up signal to the plurality of second UEs based at least in part on the one or more indicators.

Aspect 18: The method of any of Aspects 1 through 17, further comprising: receiving, from one or more of the plurality of second UEs, one or more broadcast messages, wherein the UE transmits the wake up signal to the plurality of second UEs based at least in part on receiving the one or more broadcast messages.

Aspect 19: The method of any of Aspects 1 through 18, wherein the wake up signal is based at least in part on a range, and the wake up signal informs the plurality of second UEs to wake up when located within the range of a location of the UE.

Aspect 20: The method of any of Aspects 1 through 19, wherein the wake up signal is based at least in part on an identifier of a geographic zone, and the wake up signal informs the plurality of second UEs to wake up when located within the geographic zone.

Aspect 21: The method of Aspect 20, wherein the plurality of second UEs use a same discontinuous reception (DRX) cycle corresponding to the geographic zone.

Aspect 22: The method of any of Aspects 20 through 21, wherein the wake up signal uses a sequence generated based at least in part on a seed corresponding to the geographic zone.

Aspect 23: The method of any of Aspects 20 through 22, wherein the geographic zone is a first geographic zone, and wherein the UE is located in a second geographic zone different than the first geographic zone.

Aspect 24: The method of Aspect 23, further comprising: determining that the UE is to move from the second geographic zone to the first geographic zone, wherein transmitting the wake up signal is based at least in part on the determination.

Aspect 25: The method of any of Aspects 23 through 24, wherein the first geographic zone is associated with a first discontinuous reception (DRX) cycle, and wherein the second geographic zone neighbors the first geographic zone and is associated with a second DRX cycle different than the first DRX cycle.

Aspect 26: The method of any of Aspects 20 through 25, wherein the geographic zone is based, at least in part, on at least one of a location of the UE, a heading of the UE, a speed of the UE, or a combination thereof.

Aspect 27: The method of any of Aspects 20 through 26, wherein the wake up signal is based at least in part on a message type to be transmitted to the plurality of second UEs.

Aspect 28: The method of any of Aspects 20 through 27, further comprising: communicating with the plurality of second UEs during an ON period of a discontinuous reception (DRX) mode, wherein the ON period is associated with the wake up signal.

Aspect 29: A method of wireless communication performed by a user equipment (UE), comprising: receiving, from a second UE, a wake up signal that is associated with the UE and with at least one third UE; and monitoring for messages from the second UE based at least in part on receiving the wake up signal.

Aspect 30: The method of Aspect 29, wherein the UE receives the wake up signal in one or more wake up signal transmission occasions.

Aspect 31: The method of any of Aspects 29 through 30, wherein the UE comprises at least one of a pedestrian UE (P-UE), a vehicle UE (V-UE), or a combination thereof.

Aspect 32: The method of any of Aspects 29 through 31, wherein the second UE comprises at least one of a vehicle UE (V-UE), a road side unit (RSU), or a combination thereof.

Aspect 33: The method of any of Aspects 29 through 32, further comprising: transmitting, to the second UE, a broadcast message including information that identifies the UE, wherein the UE receives the wake up signal based at least in part on transmitting the broadcast message.

Aspect 34: The method of any of Aspects 29 through 33, wherein the UE monitors for messages from the second UE within a time window based at least in part on the wake up signal.

Aspect 35: The method of any of Aspects 29 through 34, wherein the UE receives the wake up signal in one or more slots within a receiving resource pool, and the UE monitors for messages from the second UE within remaining slots of the receiving resource pool.

Aspect 36: The method of any of Aspects 29 through 35, wherein the wake up signal is based at least in part on one or more of: a group identifier associated with a group including the UE and the at least one third UE; location information associated with the second UE; location information associated with the UE and the at least one third UE; a UE identifier associated with the second UE; one or more UE identifiers associated with the UE and the at least one third UE; or a combination thereof.

Aspect 37: The method of any of Aspects 29 through 36, wherein the wake up signal comprises at least one of sidelink control information (SCI), a medium access control (MAC) layer control element (MAC-CE), or a combination thereof.

Aspect 38: The method of Aspect 37, wherein the wake up signal includes a message with information that indicates the UE and the at least one third UE.

Aspect 39: The method of any of Aspects 29 through 36, wherein the wake up signal comprises at least one sequence.

Aspect 40: The method of Aspect 39, wherein the wake up signal includes a sequence that the UE maps to information that indicates the UE and the at least one third UE.

Aspect 41: The method of any of Aspects 29 through 40, wherein the UE and the at least one third UE form a group, and wherein the method further comprises: transmitting, to the at least one third UE, at least one message to form the group; receiving, from the at least one third UE, at least one message to form the group; or a combination thereof.

Aspect 42: The method of any of Aspects 29 through 41, wherein the UE and the at least one third UE form a group, and wherein the group is associated with a group identifier.

Aspect 43: The method of Aspect 42, further comprising: transmitting, to the second UE, a broadcast message including the group identifier.

Aspect 44: The method of any of Aspects 29 through 43, further comprising: transmitting, to the second UE, an indicator of a location of the UE, wherein the UE receives the wake up signal based at least in part on transmitting the indicator.

Aspect 45: The method of any of Aspects 29 through 44, further comprising: determining that the wake up signal is associated with the UE, wherein the UE monitors for messages from the second UE based at least in part on determining that the wake up signal is associated with the UE.

Aspect 46: The method of Aspect 45, wherein the UE determines that the wake up signal is associated with the UE based at least in part on the wake up signal being associated with a group identifier of a group of UEs including the UE.

Aspect 47: The method of any of Aspects 29 through 46, wherein the UE determines that the wake up signal is associated with the UE based at least in part on the wake up signal being associated with a UE identifier of the UE.

Aspect 48: The method of any of Aspects 29 through 47, wherein the UE determines that the wake up signal is associated with the UE based at least in part on determining that the UE is located within a range of a location of the second UE, wherein the wake up signal indicates the range and the location of the second UE.

Aspect 49: The method of any of Aspects 29 through 48, wherein the UE determines that the wake up signal is associated with the UE based at least in part on determining that the UE is located with a geographic zone associated with the wake up signal, wherein the wake up signal is based at least in part on an identifier of the geographic zone.

Aspect 50: The method of Aspect 49, wherein the UE uses a discontinuous reception (DRX) cycle corresponding to the geographic zone.

Aspect 51: The method of any of Aspects 49 through 50, wherein the wake up signal uses a sequence generated based at least in part on a seed corresponding to the geographic zone.

Aspect 52: The method of any of Aspects 49 through 51, further comprising: determining to enter an ON period of a discontinuous reception (DRX) mode based at least in part on the wake up signal and the geographic zone.

Aspect 53: The method of any of Aspects 49 through 52, wherein the geographic zone is a first geographic zone, and wherein the second UE is located in a second geographic zone different than the first geographic zone.

Aspect 54: The method of Aspect 53, wherein the first geographic zone is associated with a first discontinuous reception (DRX) cycle, and wherein the second geographic zone neighbors the first geographic zone and is associated with a second DRX cycle different than the first DRX cycle.

Aspect 55: The method of any of Aspects 53 through 54, further comprising: determining to enter an ON period of a discontinuous reception (DRX) mode based at least in part on the wake up signal and the second geographic zone.

Aspect 56: The method of any of Aspects 29 through 55, wherein the wake up signal is based at least in part on a message type to be transmitted to the plurality of second UEs.

Aspect 57: The method of Aspect 56, further comprising: determining to enter an ON period of a discontinuous reception (DRX) mode based at least in part on the wake up signal and the message type.

Aspect 58: The method of any of Aspects 29 through 57, further comprising: communicating with the second UE during an ON period of a discontinuous reception (DRX) mode, wherein the ON period is associated with the wake up signal.

Aspect 59: The method of any of Aspects 29 through 44, further comprising: determining that the wake up signal is not associated with the UE; and discarding the wake up signal based at least in part on determining that the wake up signal is not associated with the UE.

Aspect 60: An apparatus for wireless communication at a device, comprising a processor; memory coupled with the processor; and instructions stored in the memory and executable by the processor to cause the apparatus to perform the method of one or more Aspects of Aspects 1-28.

Aspect 61: A device for wireless communication, comprising a memory and one or more processors coupled to the memory, the memory and the one or more processors configured to perform the method of one or more Aspects of Aspects 1-28.

Aspect 62: An apparatus for wireless communication, comprising at least one means for performing the method of one or more Aspects of Aspects 1-28.

Aspect 63: A non-transitory computer-readable medium storing code for wireless communication, the code comprising instructions executable by a processor to perform the method of one or more Aspects of Aspects 1-28.

Aspect 64: A non-transitory computer-readable medium storing a set of instructions for wireless communication, the set of instructions comprising one or more instructions that, when executed by one or more processors of a device, cause the device to perform the method of one or more Aspects of Aspects 1-28.

Aspect 65: An apparatus for wireless communication at a device, comprising a processor; memory coupled with the processor; and instructions stored in the memory and executable by the processor to cause the apparatus to perform the method of one or more Aspects of Aspects 29-59.

Aspect 66: A device for wireless communication, comprising a memory and one or more processors coupled to the memory, the memory and the one or more processors configured to perform the method of one or more Aspects of Aspects 29-59.

Aspect 67: An apparatus for wireless communication, comprising at least one means for performing the method of one or more Aspects of Aspects 29-59.

Aspect 68: A non-transitory computer-readable medium storing code for wireless communication, the code comprising instructions executable by a processor to perform the method of one or more Aspects of Aspects 29-59.

Aspect 69: A non-transitory computer-readable medium storing a set of instructions for wireless communication, the set of instructions comprising one or more instructions that, when executed by one or more processors of a device, cause the device to perform the method of one or more Aspects of Aspects 29-59.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors coupled to the memory, § the one or more processors configured to:
        generate a wake up signal to wake up a plurality of second UEs, wherein the wake up signal is based at least in part on location information associated with the UE, location information associated with one or more of the plurality of second UEs, or a combination thereof; and transmit, to the plurality of second UEs, the wake up signal, wherein:
  the wake up signal is based at least in part on an identifier of a geographic zone,
  the wake up signal indicates to the plurality of second UEs to wake up when located within the geographic zone, and
  the wake up signal is transmitted based at least in part on a discontinuous reception (DRX) cycle corresponding to the geographic zone.

2. The UE of claim 1, wherein the one or more processors, to transmit the wake up signal, are configured to transmit the wake up signal in one or more wake up signal transmission occasions.

3. The UE of claim 1, wherein the UE comprises at least one of a vehicle UE (V-UE), a road side unit (RSU), or a combination thereof.

4. The UE of claim 1, wherein the plurality of second UEs comprise at least one of a pedestrian UE (P-UE), a vehicle UE (V-UE), or a combination thereof.

5. The UE of claim 1, wherein the wake up signal indicates to the plurality of second UEs to monitor for messages from the UE during a time window.

6. The UE of claim 1, wherein the one or more processors, to transmit the wake up signal, are configured to transmit the wake up signal in one or more slots within a receiving resource pool associated with the plurality of second UEs.

7. The UE of claim 1, wherein the wake up signal includes a message with information that indicates the plurality of second UEs.

8. The UE of claim 1, wherein the wake up signal includes a sequence that is based at least in part on information that indicates the plurality of second UEs.

9. The UE of claim 1, wherein the wake up signal includes a sequence generated based at least in part on a seed corresponding to the geographic zone.

10. The UE of claim 1, wherein the geographic zone is a first geographic zone, and wherein the UE is located in a second geographic zone different than the first geographic zone.

11. The UE of claim 10, wherein the one or more processors are further configured to:
  determine that the UE is to move from the second geographic zone to the first geographic zone,
  wherein the wake up signal is transmitted based at least in part on the determination.

12. The UE of claim 10, wherein the DRX cycle corresponding to the first geographic zone is a first DRX cycle, and wherein the second geographic zone neighbors the first geographic zone and is associated with a second DRX cycle different than the first DRX cycle.

13. A user equipment (UE) for wireless communication, comprising:
  a memory; and
  one or more processors coupled to the memory, the one or more processors configured to:
    receive, from a second UE, a wake up signal that is associated with the UE and with at least one third UE, wherein the wake up signal is based at least in part on location information associated with the second UE, location information associated with the UE and the at least one third UE, or a combination thereof;
    determine that the wake up signal is associated with the UE based at least in part on a determination that the UE is located within a geographic zone associated with the wake up signal, wherein the wake up signal is based at least in part on an identifier of the geographic zone, and wherein the wake up signal is received based at least in part on a discontinuous reception (DRX) cycle corresponding to the geographic zone and used by the UE; and
    monitor for messages from the second UE based at least in part on receiving the wake up signal and determining that the wake up signal is associated with the UE.

14. The UE of claim 13, wherein the one or more processors, to receive the wake up signal, are configured to receive the wake up signal in one or more wake up signal transmission occasions.

15. The UE of claim 13, wherein the one or more processors, to monitor for messages from the second UE, are configured to monitor within a time window based at least in part on the wake up signal.

16. The UE of claim 13, wherein the wake up signal is received in one or more slots within a receiving resource pool, and remaining slots of the receiving resource pool are monitored for messages from the second UE.

17. The UE of claim 13, wherein the wake up signal includes a message with information that indicates the UE and the at least one third UE.

18. The UE of claim 13, wherein the wake up signal includes a sequence that is associated with information that indicates the UE and the at least one third UE.

19. The UE of claim 13, wherein the wake up signal includes a sequence generated based at least in part on a seed corresponding to the geographic zone.

20. The UE of claim 13, wherein the one or more processors are further configured to:
  determine to enter an ON period of a discontinuous reception (DRX) mode based at least in part on the wake up signal and the geographic zone.

21. The UE of claim 13, wherein the geographic zone is a first geographic zone, and wherein the second UE is located in a second geographic zone different than the first geographic zone.

22. The UE of claim 21, wherein the DRX cycle corresponding to the first geographic zone is a first DRX cycle, and wherein the second geographic zone neighbors the first geographic zone and is associated with a second DRX cycle different than the first DRX cycle.

23. The UE of claim 22, wherein the one or more processors are further configured to:
  determine to enter an ON period of a discontinuous reception (DRX) mode based at least in part on the wake up signal and the second geographic zone.

24. A method of wireless communication performed by a user equipment (UE), comprising:
  generating a wake up signal to wake up a plurality of second UEs, wherein the wake up signal is based at least in part on location information associated with the UE, location information associated with one or more of the plurality of second UEs, or a combination thereof; and
  transmitting, to the plurality of second UEs, the wake up signal, wherein:
    the wake up signal is based at least in part on an identifier of a geographic zone,
    the wake up signal indicates to the plurality of second UEs to wake up when located within the geographic zone, and
    the wake up signal is transmitted based at least in part on a discontinuous reception (DRX) cycle corresponding to the geographic zone.

25. A method of wireless communication performed by a user equipment (UE), comprising:
- receiving, from a second UE, a wake up signal that is associated with the UE and with at least one third UE, wherein the wake up signal is based at least in part on location information associated with the second UE, location information associated with the UE and the at least one third UE, or a combination thereof;
- determining that the wake up signal is associated with the UE based at least in part on a determination that the UE is located within a geographic zone associated with the wake up signal, wherein the wake up signal is based at least in part on an identifier of the geographic zone, and wherein the wake up signal is received based at least in part on a discontinuous reception (DRX) cycle corresponding to the geographic zone and used by the UE; and
- monitoring for messages from the second UE based at least in part on receiving the wake up signal and determining that the wake up signal is associated with the UE.

26. The method of claim 24, wherein transmitting the wake up signal comprises:
- transmitting the wake up signal in one or more wake up signal transmission occasions.

27. The method of claim 24, wherein the UE comprises at least one of a vehicle UE (V-UE), a road side unit (RSU), or a combination thereof.

28. The method of claim 24, wherein the plurality of second UEs comprise at least one of a pedestrian UE (P-UE), a vehicle UE (V-UE), or a combination thereof.

29. The method of claim 24, wherein the wake up signal indicates to the plurality of second UEs to monitor for messages from the UE during a time window.

30. The method of claim 25, wherein receiving the wake up signal comprises:
- receiving the wake up signal in one or more wake up signal transmission occasions.

* * * * *